United States Patent [19]

Janssen

[11] 3,946,654
[45] Mar. 30, 1976

[54] COOKING UTENSILS

[76] Inventor: Alexander Patton Janssen, 28 Old Farm Road, Bellair, Charlottesville, Va. 22901

[22] Filed: Jan. 29, 1973

[21] Appl. No.: 327,658

[52] U.S. Cl. ................................. 99/403; 99/410
[51] Int. Cl.² ......................................... A47J 27/10
[58] Field of Search ............ 99/403, 330, 332, 336, 99/345, 355, 359, 404–405, 406–407, 489, 408–409, 410–411, 412–413, 414–415, 416–417, 418, 295, 323, 349, 425, 444–445, 446, 467; 53/14, 384; 220/63, 65

[56] References Cited
UNITED STATES PATENTS

| | | | |
|---|---|---|---|
| 457,471 | 8/1891 | Bregha | 99/467 |
| 913,431 | 2/1909 | Renner | 99/410 |
| 975,843 | 11/1910 | Duffy | 99/410 |
| 1,566,874 | 12/1925 | Jackson | 99/403 |
| 2,219,950 | 10/1940 | Childs | 99/403 X |
| 2,323,623 | 7/1943 | Porter et al. | 99/403 |
| 2,393,420 | 1/1946 | Scheuplein | 99/403 |
| 2,614,484 | 10/1952 | Caruso | 99/403 |
| 2,667,117 | 1/1954 | Millard et al. | 99/418 |
| 2,728,670 | 12/1955 | Young et al. | 99/295 UX |
| 3,427,955 | 2/1969 | Menzin | 99/444 X |

FOREIGN PATENTS OR APPLICATIONS 15,953   1/1911   United Kingdom.................. 99/295

*Primary Examiner*—Edward L. Roberts
*Assistant Examiner*—Arthur O. Henderson
*Attorney, Agent, or Firm*—Strauch, Nolan, Neale, Nies & Kurz

[57] ABSTRACT

Cooking utensils for both stovetop and oven cookery. They are primarily intended to be used in conjunction with a disposable bag or liner to produce cooked comestibles of superior quality and to eliminate the cleaning appurtenant to the use of conventional cooking vessels. Certain versions can, however, be used to advantage when cooking by conventional techniques.

27 Claims, 28 Drawing Figures

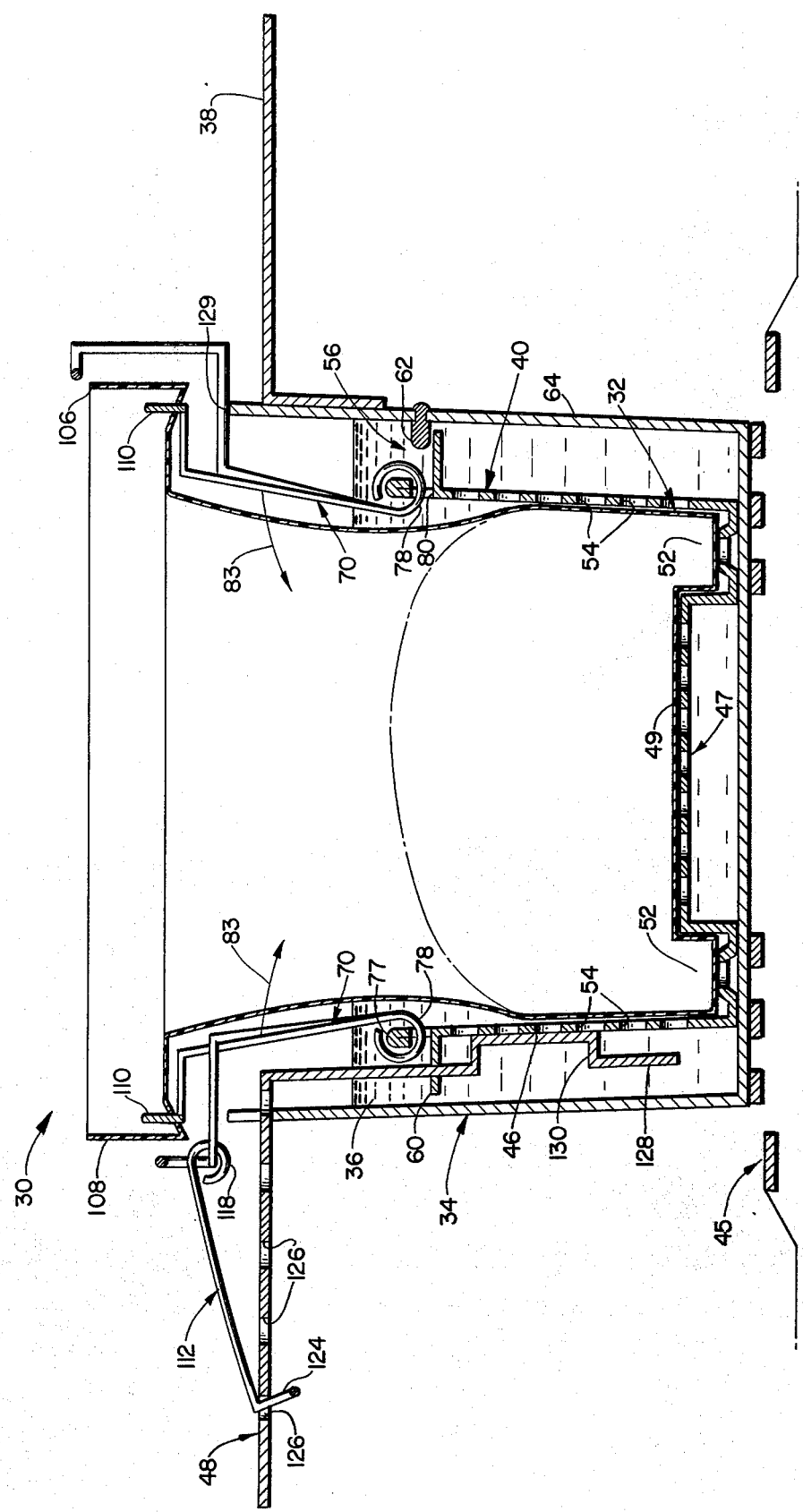

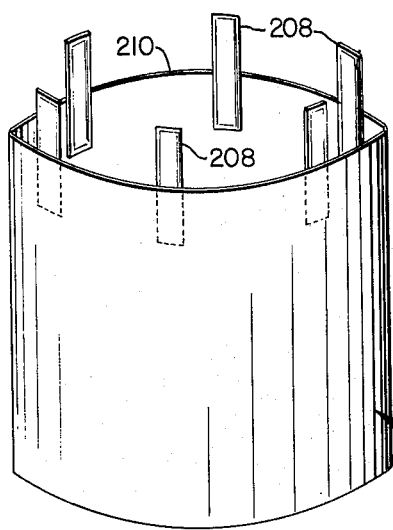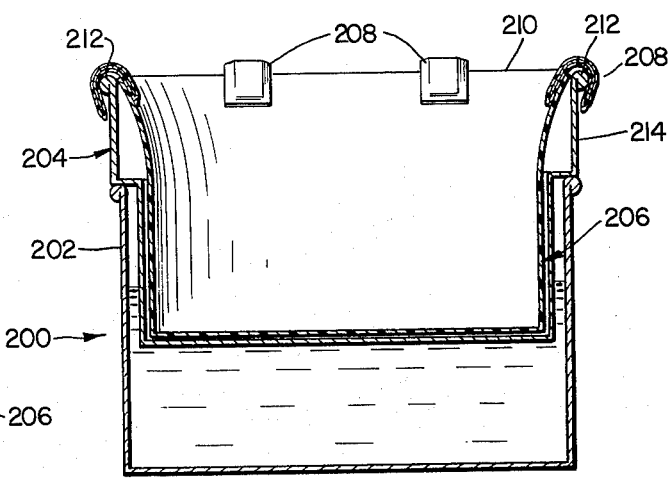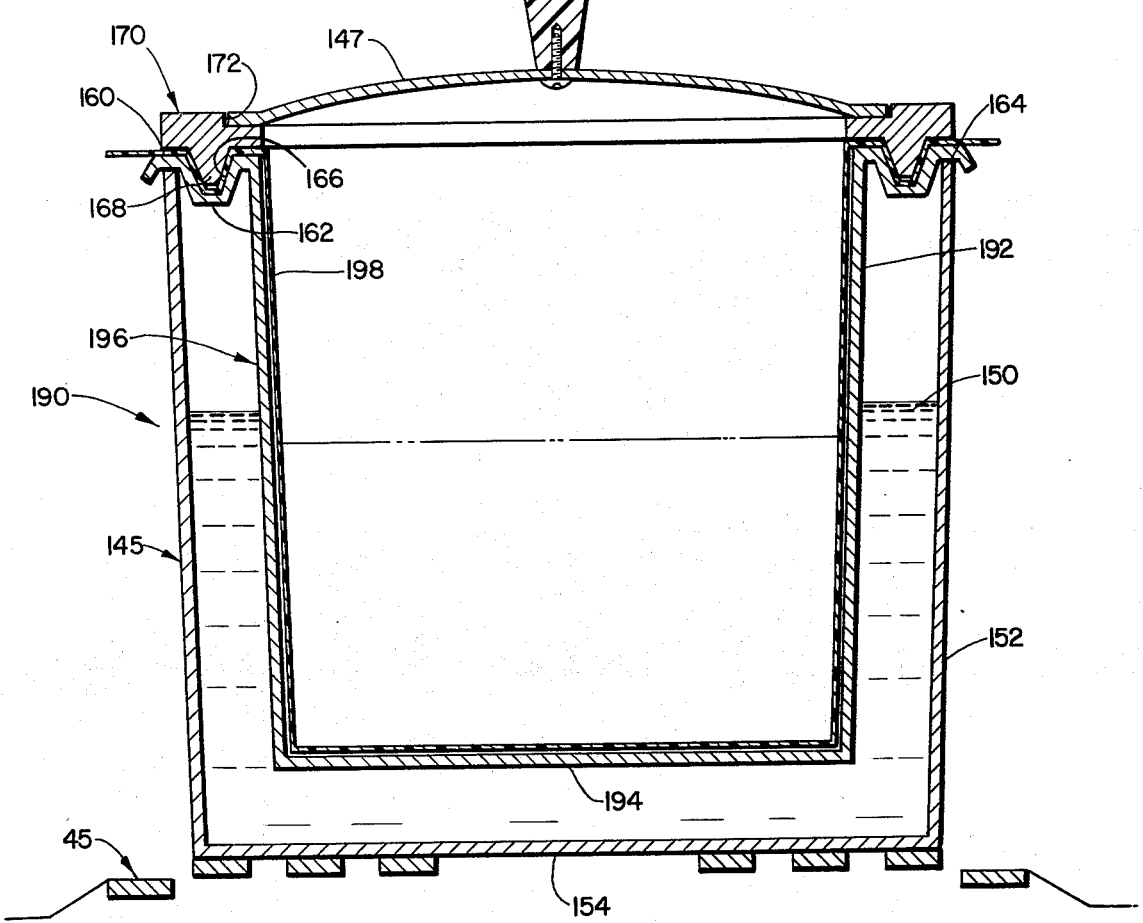

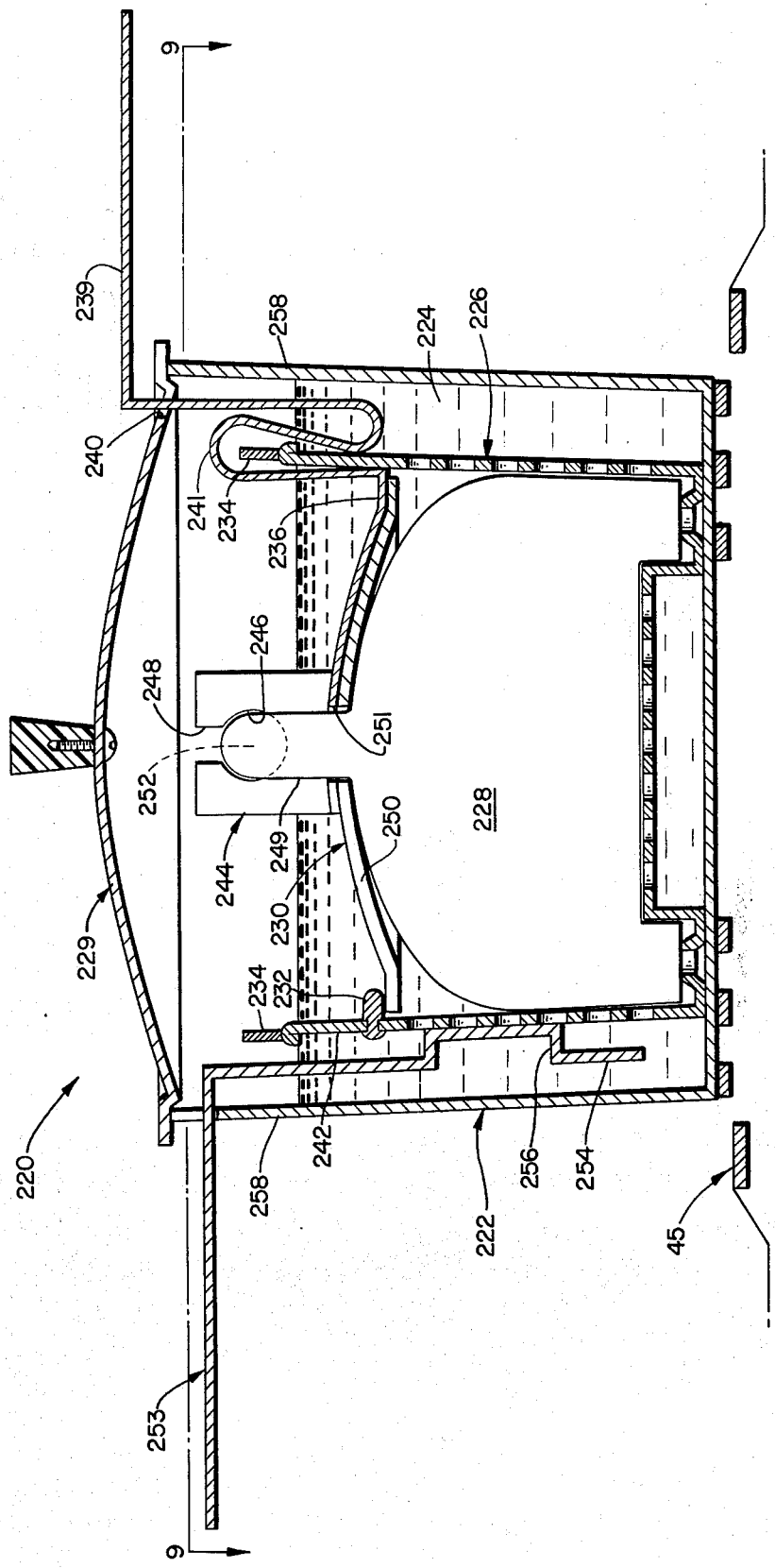

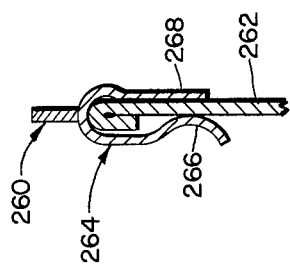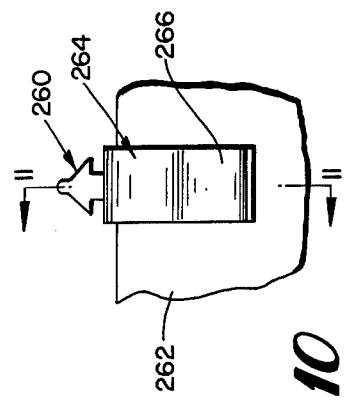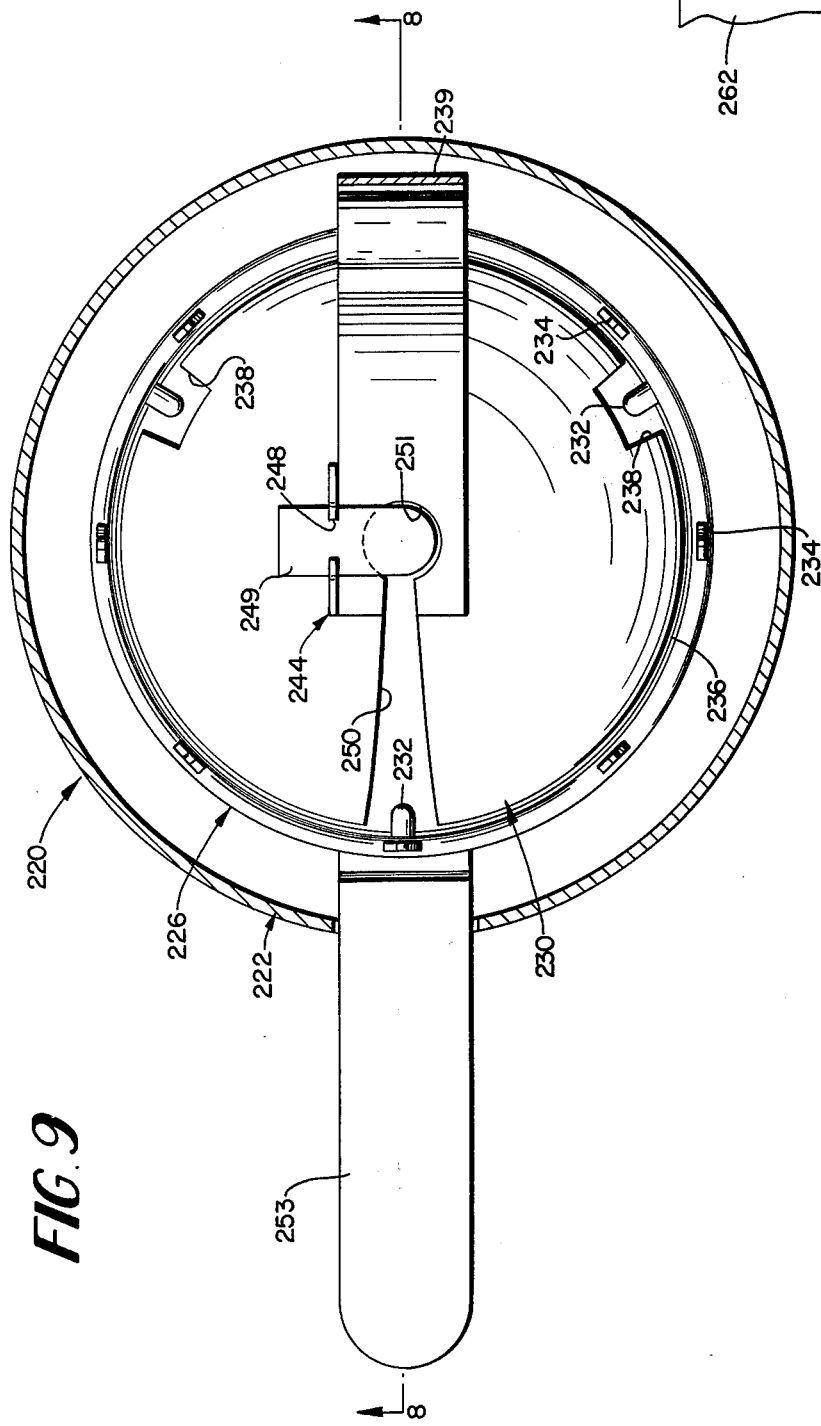

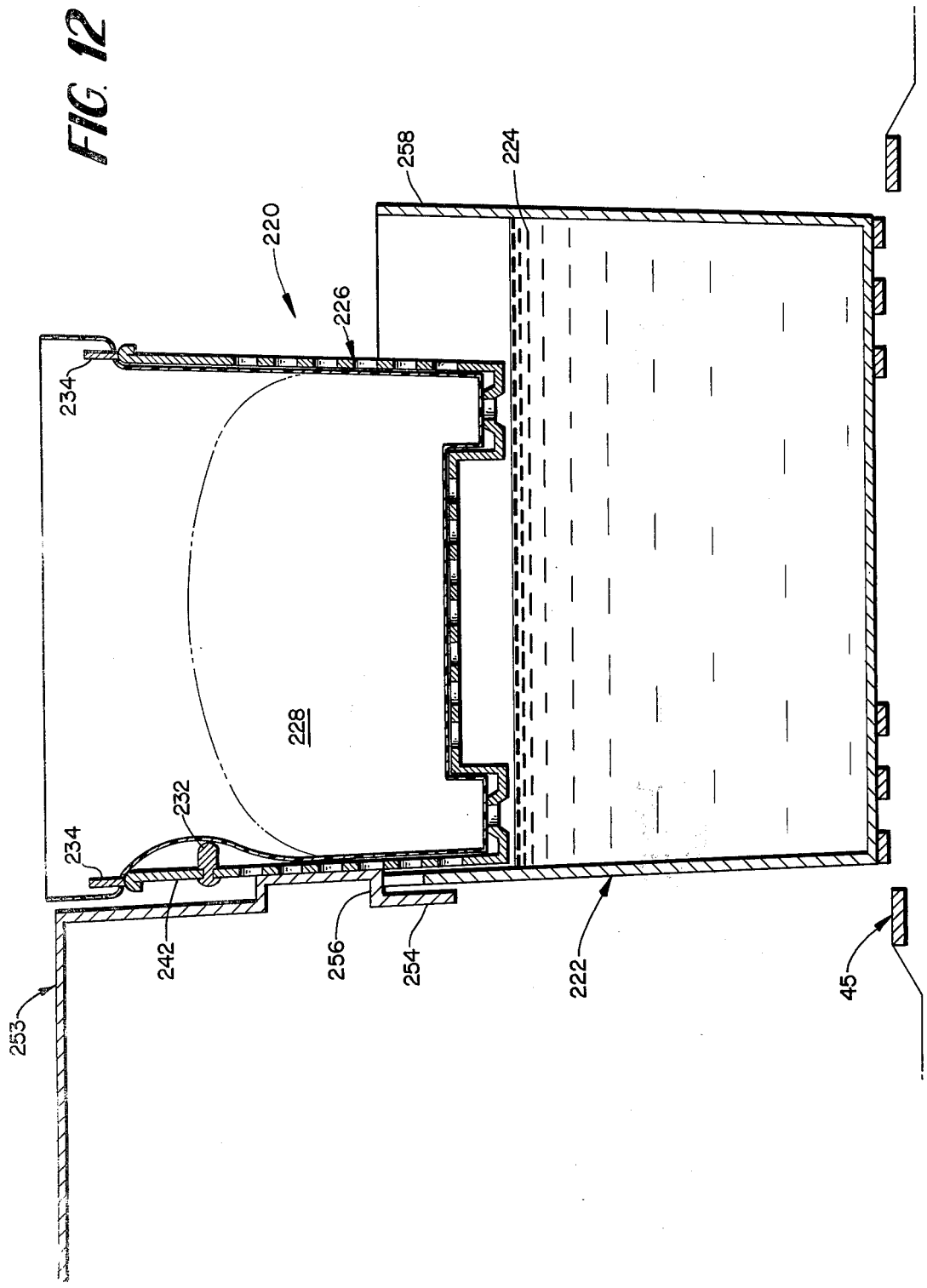

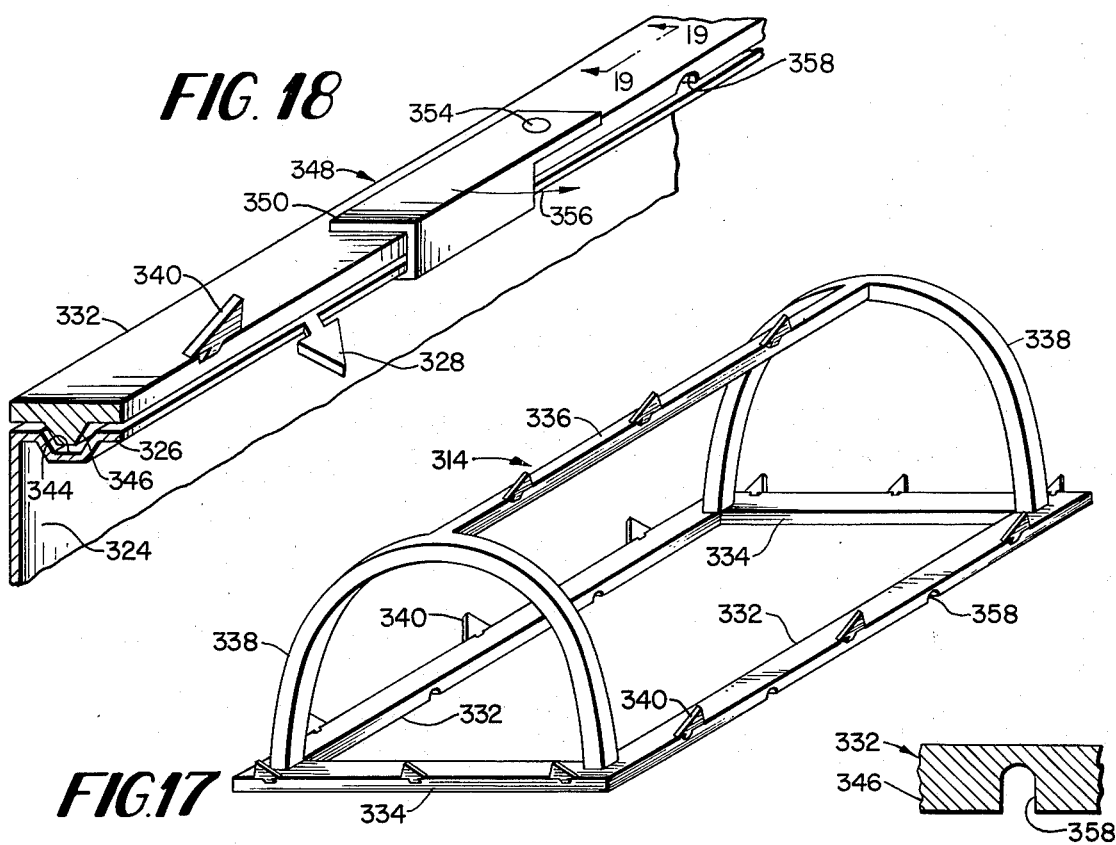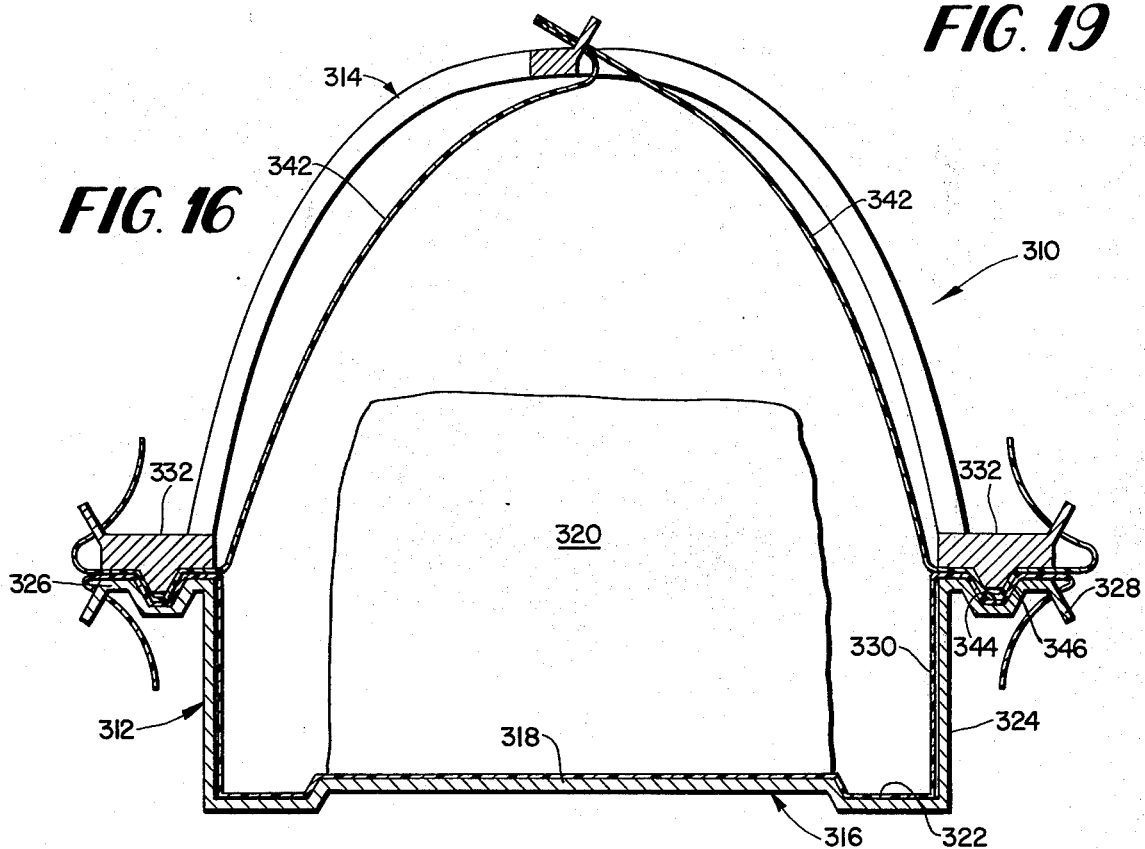

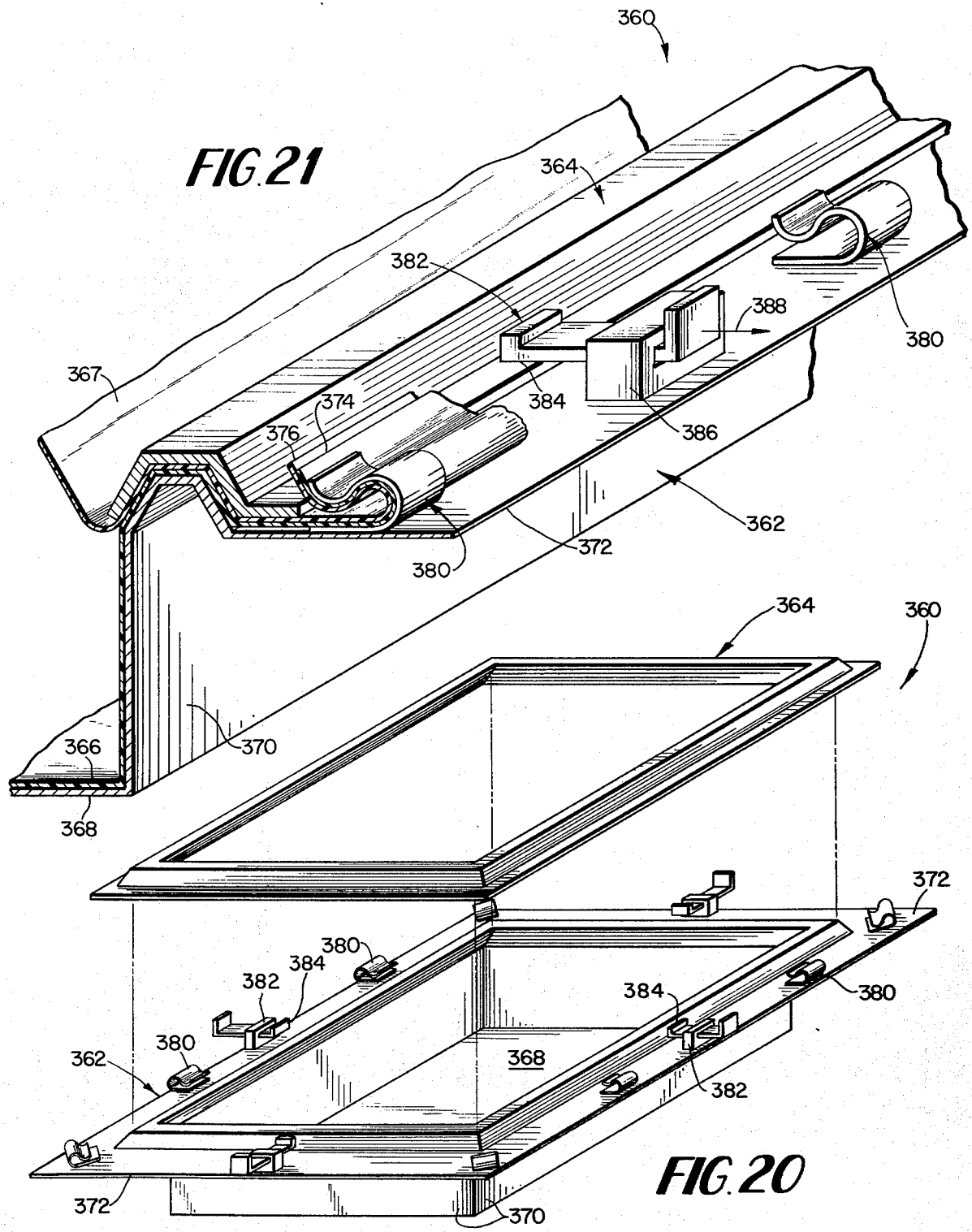

COOKING UTENSILS

This invention relates to cooking utensils and, more particularly, to novel, improved cooking utensils for both stovetop and oven cookery.

The novel cooking utensils of the present invention are intended to be used in many, if not most, instances with a disposable bag or liner in which the comestibles are contained during the cooking process. (The term "bag" as employed herein is intended to have a broad meaning and to include sheets of material gathered into a baglike form, etc. as well as those formed containers more conventionally thought of as bags). This bag or liner is surrounded by a cooking medium for transferring heat to its contents during the cooking cycle. The cooking medium will typically be water or an oil in the case of stovetop cookery and air for oven cookery.

Cooking in bags or disposable liners of the character just described has a number of important advantages. First, this permits comestibles to be cooked in their own juices. The natural taste of the food is preserved and the loss of nutritional values which occurs when foods are cooked in water is avoided along with the musy or waterlogged texture which commonly results.

Another virtue is that the utensil is not soiled during the cooking process. Thus, the inconvenience of cleaning the utensil after it is used is eliminated; only rinsing and drying are required.

Furthermore, the bag or liner in which the comestibles are cooked is utilizable to store them. This is a particular convenience if the bag or liner is stored in a refrigerator container or the like as the latter will not become soiled.

To obtain optimum results the cooking vessels I have invented for use with disposable bags and liners are provided with one or more of several novel features not heretofore found in cooking vessels.

One of these is an arrangement for keeping a bag and the comestibles contained in it submersed in the cooking medium when comestibles which would otherwise float are being cooked. This results in heat being conducted uniformly to the comestibles from all directions and, typically, at a higher temperature than it would be if the bag and its contents were allowed to float in the cooking medium. As a consequence, the comestibles are cooked more quickly and more uniformly.

The bag holding arrangement can be constructed so that it will keep the bag and comestibles in place by its own weight. Alternatively, provision may be made for positively or mechanically securing the holddown device in position to achieve this goal.

The bag holding arrangement may also, or instead, be designed to secure the upper, open end of the bag in a manner that will allow gases and vapors evolved from the comestibles to escape while keeping the cooking medium from entering the bag. This permits the bag to collapse against its contents, considerably increasing the efficiency with which heat is transferred to the comestibles; it also maximizes the uniformity with which heat is transferred to the comestibles from different directions. This type of arrangement can of course also be employed in conventional cooking methods to keep the comestibles submersed in the cooking medium. In this style of cookery, also evenness and quickness of cooking is promoted by the use of such a device.

The holddown device may also be constructed so that it can be manipulated to spread the upper end of the bag and thereby facilitate access to its contents. Alternatively, the cooking utensil may be provided with a separate arrangement to which the cook can secure the upper end of the bag and keep it spread open.

Similar arrangements may be employed in my novel cooking utensils to hold disposable liners in place. In both cases the devices for securing the end of the bag or liner in place can be incorporated in the cooking utensil or the disposable element of the combination, or they may include cooperating parts of the utensil and the bag or liner or be entirely separate elements.

Another feature possessed by certain of the novel cooking utensils I have invented is an arrangement for holding the comestibles and the bag or liner in which they are contained in an elevated position out of the cooking medium. This, again, facilitates the handling of the comestibles and the bag or liner.

Typically, a cooking utensil in accord with the present invention intended for stovetop cookery will include an outer container for the cooking medium and an inner container for supporting the bag or liner and its contents; and the device described in the preceding paragraph will be constructed to hold the inner container in an elevated position relative to the outer one. The inner container will often be of perforate construction. This permits the sides and bottom of the bag and its contents to be almost completely surrounded by the cooking medium, maximizing the contact between the medium and the bag and contents.

An inner container facilitates the removal of the cooked comestibles from one area to another. It also permits the cooked comestibles to be kept warm until served without overcooking them as the cooking utensil operates essentially as a double boiler when the inner container is removed to its elevated position. In addition, the inner container facilitates the removal of cooked comestibles from a bag or liner as the cooking medium cannot press the bag or liner against the comestibles.

The inner container can also be furnished with a well for collecting excess fluids generated in the cooking process. This keeps the fluids from contacting and causing unwanted changes in the flavor, texture, or appearance of the comestibles being cooked. Separation of the fluids also facilitates collection of the fluids at the end of the cooking cycle.

It is not essential that an inner container be employed although maximum convenience may in many cases be obtained by employing one. The inner container can be omitted altogether or replaced by a rack or other component which will permit the cooking medium to circulate under and around the comestibles being cooked and the bag or liner in which they are contained. In other applications the inner container may advantageously be made imperforate like the inner container of a double boiler.

The arrangement for keeping the comestibles submersed in the cooking liquid can be combined with the inner container into a single unit. In any event the inner container will cooperate with the holddown device to promote quickness of cooking.

The novel cooking utensils of the present invention are useful for both stovetop and oven cookery. In the latter, yet another type of cooking utensil will typically be employed in applications where a conventional roaster is most commonly used at the present time.

Such utensils include a container, an arrangement for holding a liner in place in the container, and a cover to which a second liner can be attached out of contact with the comestibles being cooked (the framework and its liner are omitted in processes where an open cooking vessel is conventionally used).

Provision may be made for forming a seal between the upper and lower liners if it is desired to minimize the escape of evolved fluids from the cooking utensil. In this case, it may be necessary to vent the cooking utensil.

The novel oven cooking utensils just described have a number of advantages over contentional cooking bags in addition to the virtues shared in common with other embodiments of my invention. For example, the comestibles can more easily be loaded into such a utensil than they can into a cooking bag.

Also, access during the cooking process for basting, seasoning, addition of other ingredients, etc. is convenient while it is virtually impossible with a cooking bag.

Further, at the end of the cooking cycle juices from the comestibles remain in the lower part of the utensil. This makes it more convenient and less messy to remove the comestibles and to utilize the juices.

Also within the scope of the invention are cooking utensils which are of the character just described but have no top or cover. In those utensils a rim or frame is clamped to the pan component to hold a liner for the latter in place. A sheet of disposable material can be simultaneously clamped to the pan component to serve as a cover, if desired.

Also, a flange can advantageously be formed around the upper edge of those cooking utensils which are to be used for oven type cookery. This flange shields the edges of the liner from direct radiation from the oven heating unit, keeping it from melting.

It will be appreciated that cooking utensils of the character just described can also be used to advantage in the preparation of many dishes by stovetop cookery.

It will also be appreciated that the features described above do not in all cases have to be integral components of a cooking utensil or of an associated bag or liner. Instead they can be made in the form of attachments for conventional cooking vessels to give the latter the advantages possessed by the novel cooking utensils disclosed herein.

Disposable bags for cooking and containers with disposable liners are as such not new as shown by U.S. Pat. Nos. 3,027,261 issued Mar. 27, 1962, to Samara; 3,052,371 issued Sept. 4, 1962, to Van Bemmelen; 3,088,255 issued May 7, 1963, to Griem; 3,117,875 issued Jan. 14, 1964, to Burns; 3,227,305 issued Jan. 4, 1966, to Enssle; and 3,590,888 issued July 6, 1971, to Coleman; British Pat. No. 965,498 published July 29, 1964; and the Drackett Products Co. pamphlet entitled "How to Use Cooking Magic Bags" copyrighted in 1971. However, a comparison of the foregoing description of applicant's invention with the various devices described in these documents will make it apparent that the latter are structurally unlike applicant's cooking utensils and disposable bags and liners and that they are not capable of producing the results for which applicant's inventions were expressly designed.

From the foregoing, it will be apparent that the primary object of the present invention resides in the provision of novel, improved cooking utensils, accessories, and attachments for cooking utensils.

Other important but more specific objects of the invention are the provision of novel cooking utensils usable in conjunction with disposable bags and liners to cook comestibles:

1. in a manner which will preserve the nutritional values of the comestibles;
2. in a manner which will keep them from acquiring a mushy or waterlogged texture;
3. in a manner which will preserve their flavor;
4. conveniently and without the soiling of cooking vessels;
5. in a manner which makes them convenient to store without soiling a storage container;
6. in a manner providing various combinations of the foregoing advantages.

Still other important but more specific objects of the invention reside in the provision of novel cooking utensils:

7. in which heat is transferred evenly from all directions to the comestibles being cooked;
8. in which comestibles cook quickly;
9. which, in conjunction with the two preceding objects, are designed to be used with a disposable, comestible-containing bag or liner and are constructed to keep the cooking medium from entering the bag during cooking while permitting gases and vapors to escape so that the bag can collapse against its contents to insure a uniform and efficient transfer of heat to the contents;
10. which include a container for holding a cooking medium and an arrangement for securing a disposable liner in the container;
11. in which, in conjunction with the preceding object, provision is made for shielding exposed parts of the liner from direct radiation from a heating unit;
12. which are intended to be used in conjunction with a disposable, comestible-containing bag or liner and which make provision for ready access to the interior of the bag or liner;
13. which include a container for the cooking medium, a comestibles-supporting component disposable in the container, and an arrangement for holding the supporting component in an elevated position relative to the container to facilitate access to the supporting component;
14. which include an arrangement for opening and/or holding open the upper end of a comestibles-containing bag;
15. in which provision is made for circulating a cooking medium into contact with at least most of the periphery of a disposable bag in which the comestibles to be cooked are contained;
16. which furnish ready access to the comestibles being cooked during, before, and after the cooking cycle;
17. in which provision is made for providing a seal between liners associated with different components of the utensil;
18. which are particularly suited for oven cookery and have advantages over cooking bags and roasters and other conventional vessels available for oven cooking;
19. which have various combinations of the novel features and advantages identified above.

Still another object of the invention resides in the incorporation of certain of the mechanical features identified above into attachments which can be used in conjunction with conventional cooking vessels to obtain various ones of the advantages previously described.

Other important objects and advantages and further novel features of the present invention will become apparent from the appended claims and as the ensuing detailed description and discussion proceeds in conjunction with the accompanying drawing, in which:

FIG. 3 is a vertical section through the cooking utensil of FIG. 1 with the aforementioned components holding the open end of the bag spread to facilitate access to its interior;

FIG. 5 is a vertical section through a double boiler type of cooking utensil equipped with a cooking bag which has built-in tabs for holding its upper end open;

FIG. 6 is a pictorial view of the cooking bag;

FIG. 7 is a vertical section through a fourth form of cooking vessel in accord with the present invention and through a disposable liner in which the comestibles are contained while they are being cooked;

Figure 1:
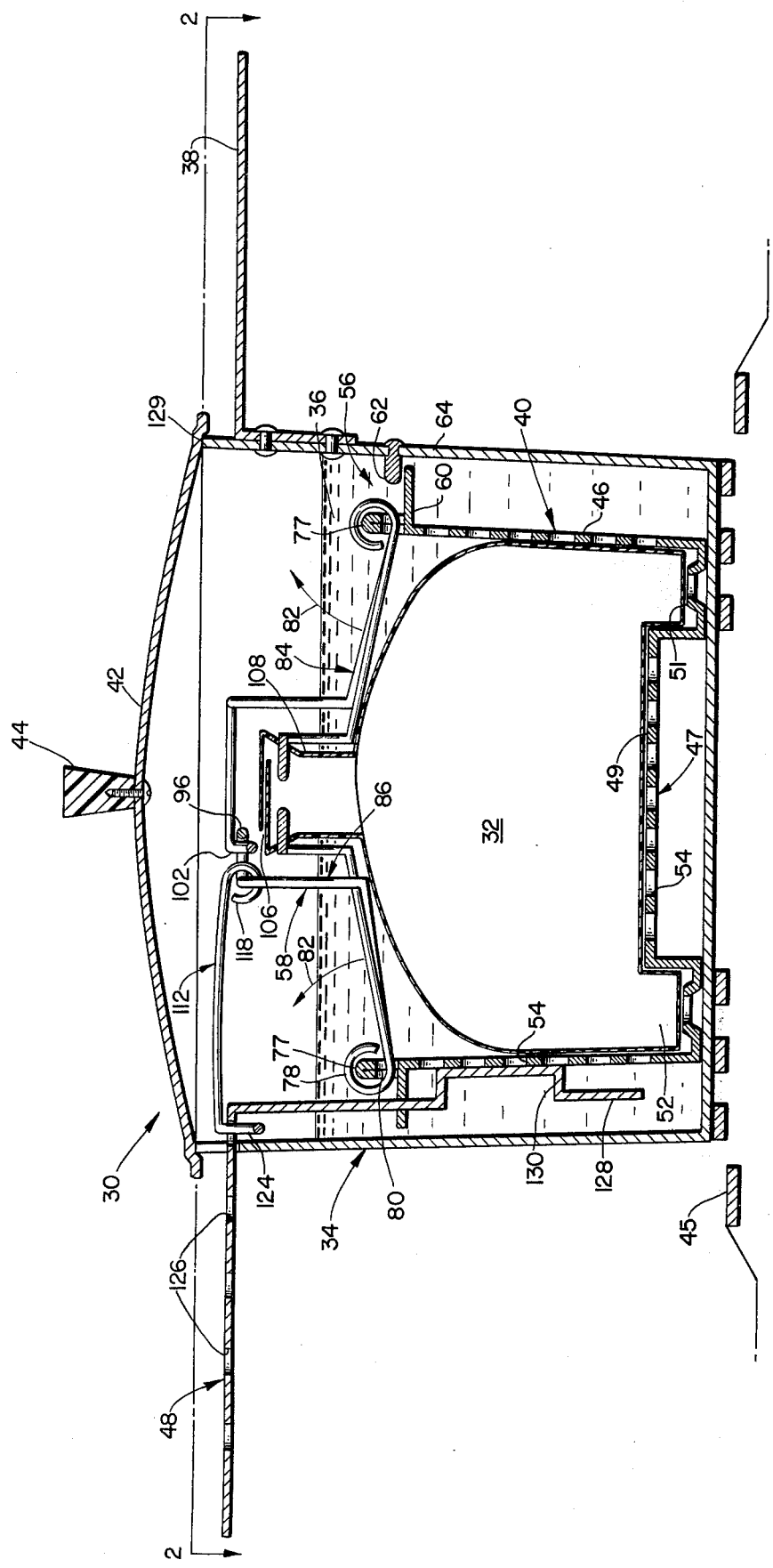
FIG. 1 is a vertical section through one form of cooking utensil constructed in accord with the principles of the present invention; it also shows a disposable bag or liner in which the comestibles are contained during the cooking process with certain components of the cooking utensil positioned to keep the open end of the bag closed; the section is taken substantially along line 1—1 of FIG. 2.
Figure 2:
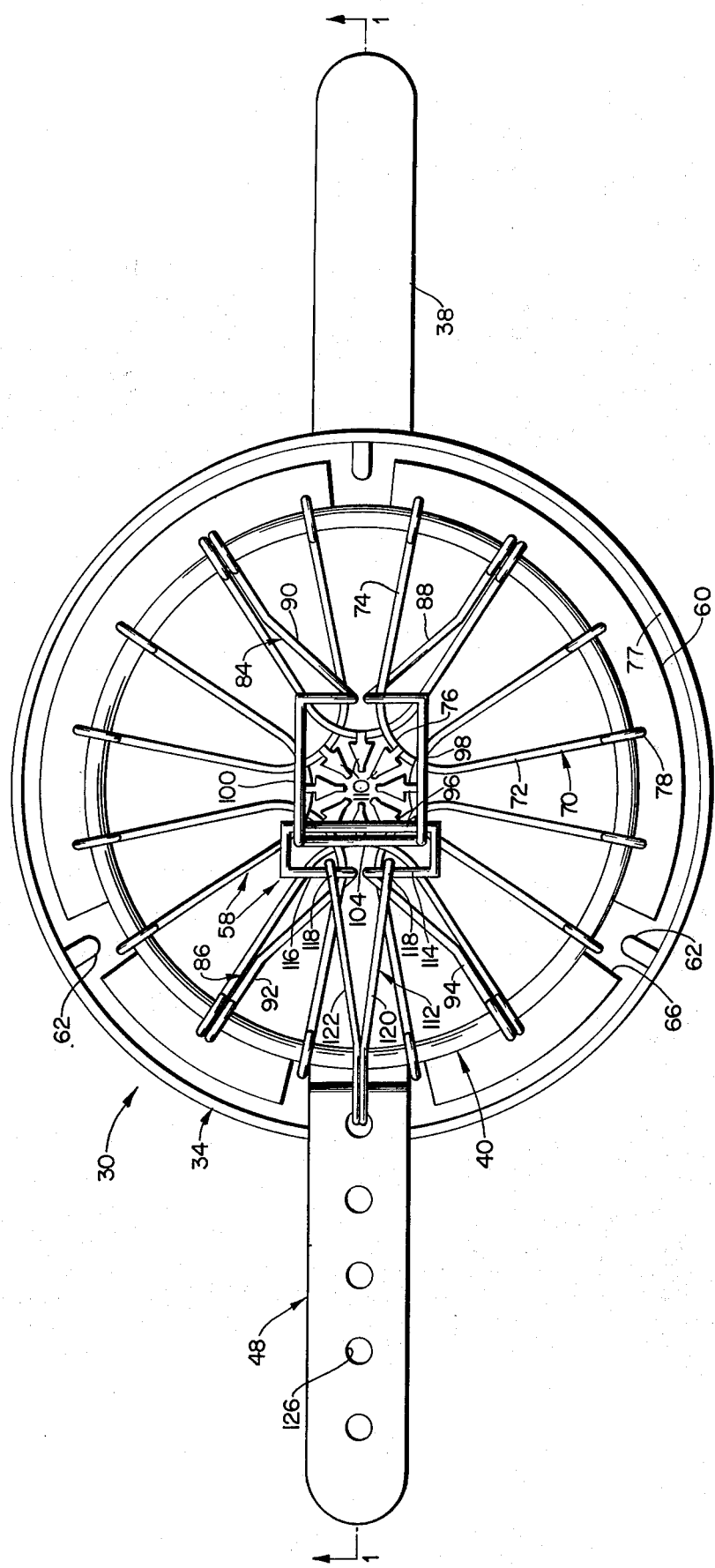
FIG. 2 is a plan view of the cooking utensil of FIG. 1.
Figure 15:
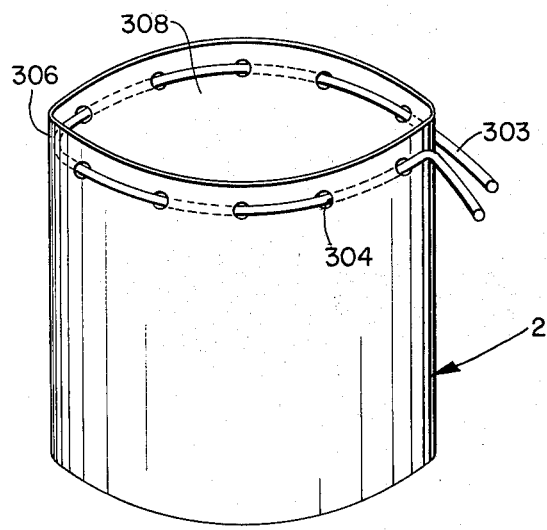
Figure 14:
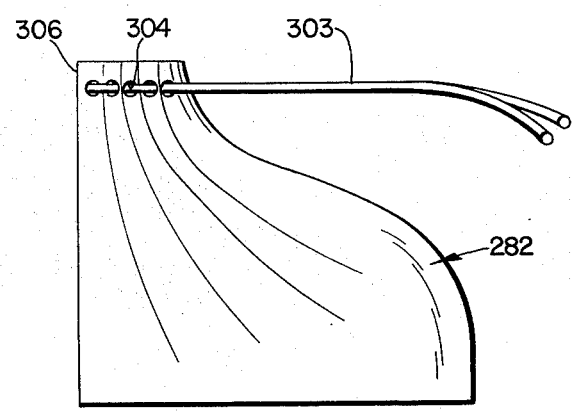
Figure 13:
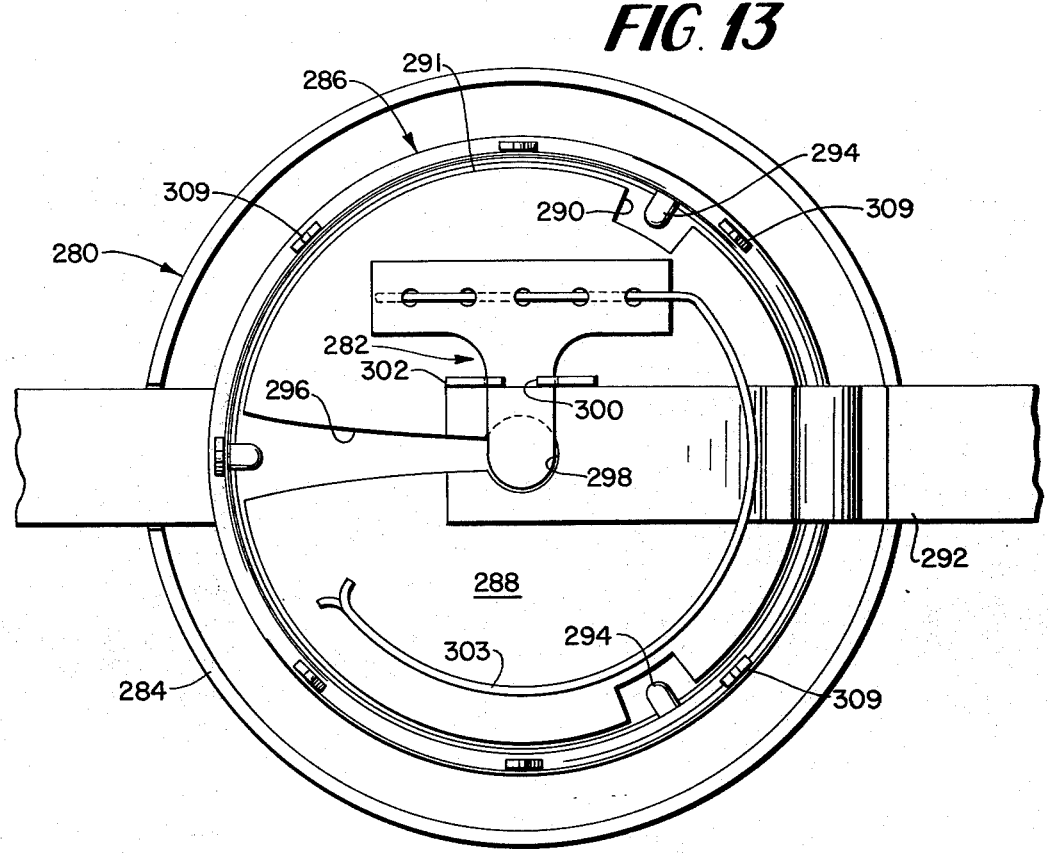
Figure 22:
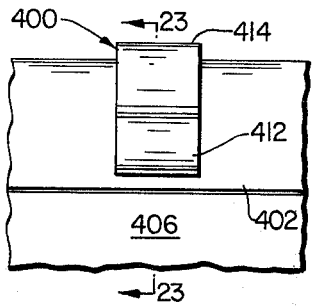
Figure 23:
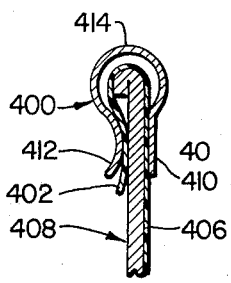
Figure 27:
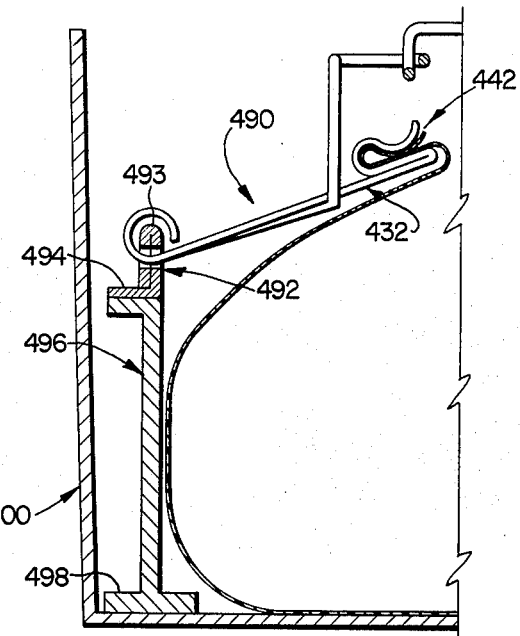
Figure 25:
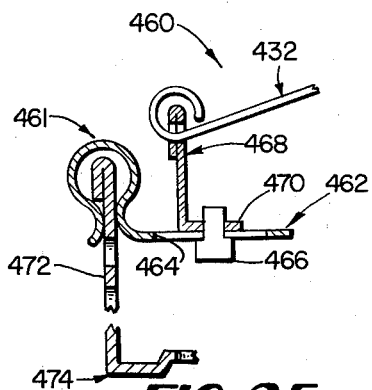
Figure 26:
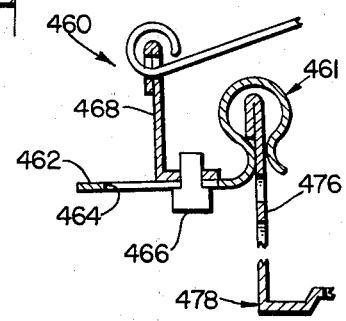
Figure 24:
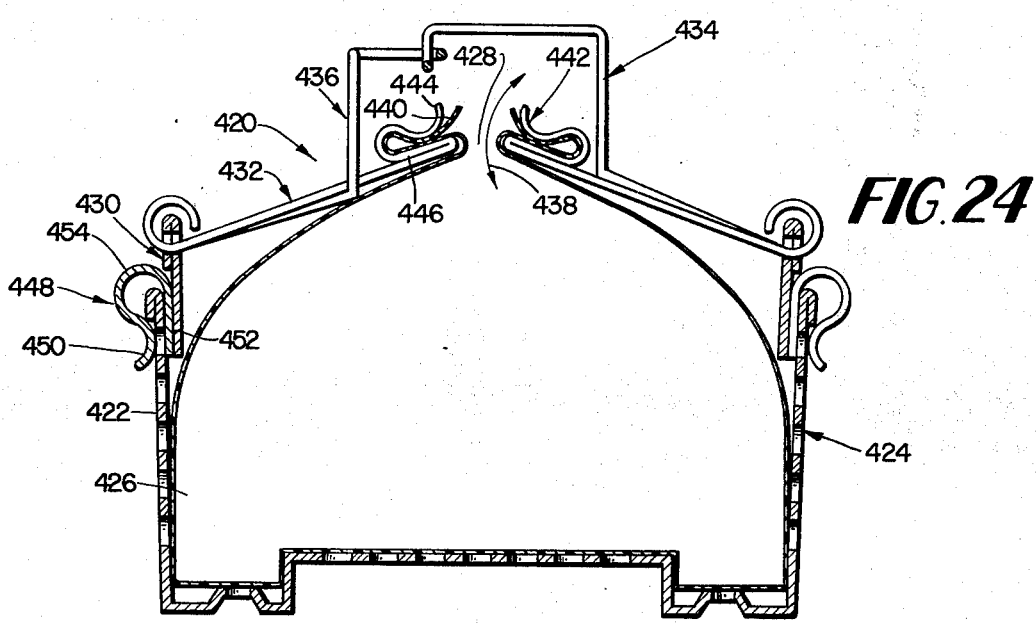

FIG. 8 is a vertical section through a fifth form of cooking utensil in accord with the principles of the present invention which has an arrangement for keeping a comestible-containing bag submersed in a cooking medium and a separate arrangement for supporting an inner container of the utensil in an elevated position to facilitate access to the interior of the bag; the section is taken substantially along lines 8—8 of FIG. 9;

FIG. 9 is a horizontal section through the cooking utensil of FIG. 8, taken substantially along line 9—9 of the latter Figure;

FIG. 10 is a fixture to which the upper end of the cooking bag can be secured to keep it open; the fixture is attachable to the inner container of the cooking utensil;

FIG. 11 is a section through the fixture and the upper end of the inner container, taken substantially along line 11—11 of FIG. 10;

FIG. 12 is a view similar to FIG. 8, but with the inner container in its elevated position and the cooking bag open;

FIG. 13 is a horizontal section through a sixth form of cooking utensil in accord with the principles of the present invention;

FIG. 14 is an elevation of a disposable cooking bag designed for use with cooking utensils of the type disclosed herein, the mouth of the bag being closed;

FIG. 15 is a view of the bag with its mouth open;

FIG. 16 is a vertical section through a seventh form of cooking utensil in accord with the principles of the present invention; this utensil is particularly intended for oven cookery;

FIG. 17 is a pictorial view of the cover of the cooking vessel of FIG. 16;

FIG. 18 is a fragment of the cover to an enlarged scale;

FIG. 19 is a partial section through the cover taken substantially along line 19—19 of FIG. 18;

FIG. 20 is a pictorial, exploded view through an eighth embodiment of my invention intended primarily for oven cookery;

FIG. 21 is a fragmentary perspective of the cooking utensil shown in FIG. 20;

FIG. 22 is a fragmentary elevation of a cooking vessel side wall and a spring type retainer for securing a disposable liner to the side wall; the vessel may be of the type disclosed herein or of conventional construction, and it may be intended for oven cookery or stovetop cookery or both;

FIG. 23 is a section through the cooking vessel and retainer of FIG. 22 and is taken substantially along line 23—23 of that Figure;

FIG. 24 is a vertical section through a cooking vessel and a holddown arrangement similar to that illustrated in FIGS. 1–3, but constructed in the form of an attachment so that it can be used with conventional cooking vessels as well as cooking utensils of the character described herein;

FIG. 25 is a fragment of a view similar to FIG. 24 showing another form of holddown attachment in accord with the principles of the present invention which can be adjusted to fit vessels of differing sizes; the attachment is shown fitted to a vessel larger than the attachment;

FIG. 26 is a view similar to FIG. 25 of the attachment illustrated in FIG. 25; in this Figure the attachment is fitted to a cooking vessel smaller in diameter than the attachment; and FIG. 27 is a vertical section through a cooking vessel and still another form of holddown attachment in accord with the principles of the present invention.

Referring now to the drawing, FIGS. 1–3 depict a cooking utensil 30 in accord with the principles of the present invention. This utensil is designed to be employed in conjunction with a disposable bag 32 to cook comestibles. It can be used for both oven and stovetop cookery.

The major components of the cooking utensil include an outer container 34 for a cooking medium 36, which has a handle 38; a bag-supporting component in the form of a panlike rack 40; and a lid or cover 42 with a handle 44. Cooking utensil 30 can be employed for oven cookery or for stovetop cookery on a heating unit such as that shown diagrammatically in FIG. 1 and identified by reference character 45.

The outer container or pan 34 and lid 42 of cooking utensil 30 are of conventional construction and will, accordingly, not be described in detail herein except as they relate to the present invention.

The bag-supporting rack 40, best shown in FIGS. 1 and 3, is dimensioned to fit in pan 34 in spaced relation to the latter. It has a side wall 46, a bottom wall 47, which typically will be integral with the side wall, and a handle 48 attached to side wall 46 in any convenient manner.

The major, central portion 49 of bottom wall 47 is elevated with respect to its peripheral portion and, accordingly, also spaced from the bottom of pan 34, permitting the cooking medium to circulate into heat transfer relationship with the bottom of bag 32 and its contents. The peripheral portion of disposable bag 32 depends into the recess 51 formed by the just-described configuration of bottom wall 47 to form a well 52. Liquids evolved during the cooking cycle collect in well 52. This keeps excess liquids out of contact with the comestibles during the cooking cycle and facilitates the removal of the comestibles apart from the liquids at the end of the cooking process.

Both the bottom and side walls of the bag-supporting rack are perforated, typical perforations being indicated by reference character 54. These perforations allow the cooking medium to circulate into direct contact with the sides and bottom of the bag. This promotes both even and rapid cooking.

Even and quick cooking is also promoted by keeping the comestibles submersed in the cooking medium. This is accomplished by the weight of the comestibles alone when their specific gravity is sufficiently high.

However, to keep lighter comestibles submersed, provision is made in cooking utensil 30 for mechanically holding disposable bag 32 and the comestibles contained in it in the cooking medium. This is accomplished by two cooperating assemblies. One 56 locks bag-holding support 40 in place in outer container 34 as shown in FIG. 1. A second 58 keeps bag 32 and its contents in support 40, preventing them from floating in the cooking medium.

Referring now specifically to FIGS. 1 and 2, the assembly 56 for locking bag-holding support 40 in place in outer container 34 includes horizontally extending, annular flanges 60 fixed to or ingetral with the side wall 46 of the rack at the upper edge thereof. It also includes stops 62 fixed in any convenient manner to the side wall 64 of outer container 34 and extending inwardly therefrom.

There are gaps 66 between adjacent flanges 60 which can be aligned with the inwardly extending pins 62. This permits rack 40 to be lowered until flanges 60 clear stops 62. The rack is then rotated, moving flanges 60 under the pins as shown in FIG. 1 to lock the rack in place.

The assembly 58 by which bag 32 is retained in support 40 to keep it submersed in the cooking medium consists primarily of a plurality of generally V-shaped, wirelike elements 70. Each element 70 has a left-hand leg 72 and a right-hand leg 74 connected by an arcuate portion 76.

V-shaped elements 70 are pivotally fixed to the side wall 46 of support 40 at the upper edge 77 thereof. Here, the wall is doubled back on itself for increased strength.

The pivotal connections are provided by circular end portions 78 of legs 72 and 74, which extend through apertures 80 in the side wall 46 of the rack and bear against its upper edge 77.

As shown in FIG. 2, the left-hand leg 72 of each element 70 lies between and below the two legs 72 and 74 of the adjacent V-shaped element. Thus, the arcuate portion 76 of each element both supports and is supported by the arcuate portion of an adjacent element. As a consequence, all of the elements 70 move in unison as one of them is rotated upwardly and outwardly as shown by arrows 82 in FIG. 1 or downwardly and inwardly as shown by arrows 83 in FIG. 3.

This movement is effected and the elements 70 latched to hold bag 32 in place as shown in FIG. 1 by two additional, also generally V-shaped, diametrically opposed elements 84 and 86. These elements are pivotally connected to rack 40 at the upper edge 77 thereof in the same manner as elements 70.

The left-hand leg 88 of element 84 lies under the right-hand leg 74 of the element 70 to its left while its right-hand leg 90 is supported by the leg 72 of the element 70 to its right. (The terms "left-hand" and "right-hand" are keyed to FIG. 2) Similarly, the left-hand leg 92 of element 86 lies under the right-hand leg of the element 70 to its left while its right-hand leg 94 is engaged from below by the left-hand leg 72 of the element 70 to its right. Accordingly, elements 84 and 86 and the several elements 70 all rotate in unison in the directions indicated by arrows 82 and 83.

At the inner ends of legs 92 and 94, element 86 extends first outwardly and then toward element 84, terminating in a latch portion 96 oriented at a right angle to the later. Similarly, at the inner ends of legs 88 and 90, element 84 extends laterally and then toward element 86, providing two, parallel, spaced apart leg portions 98 and 100 terminating in downwardly extending latch portions 102 (one of which is shown in FIG. 1) connected by a transversely extending portion 104. With elements 70, 84, and 86 rotated downwardly to keep bag 32 and its contents from floating in the cooking medium, the latch portions 102 of element 84 engage the cooperating latch portion 96 of element 86 to lock the elements in place.

Element 84 also constitutes a handle or grip by which it and elements 70 and 86 can be rotated between the positions shown in FIGS. 1, 2, and 3.

A second and also important function of the assembly 58 just described is to narrow the opening 106 of bag 32 (shown in FIG. 1) during cooking and spread the bag for access to its contents as shown in FIG. 3. With the upper end portion 108 of the bag gathered to narrow opening 106 as shown in FIG. 1, the cooking medium and condensates are kept from entering the bag and mingling with its contents. At the same time, a small opening remains; this permits vapors and gases evolved during the cooking process to escape from the bag. As discussed above, both this and the keeping of unwanted fluids from the interior of the bag contribute to the production of cooked comestibles of superior quality.

To open and close bag 32, triangular barbs or prongs 110 are fixed in any convenient fashion to the inner, arcuate portions 76 of V-shaped elements 70. A bag (or bag containing comestibles) is loaded into rack 40 with its open end 106 facing upwardly. The upper portion 108 of the bag is then pressed downwardly at locations corresponding to those of barbs 110 to engage the bag with the barbs at intervals around its periphery.

With the bag secured to barbs 110, its upper portion 108 is gathered to narrow opening 106 when operator element 84 is rotated downwardly and inwardly because of the concomitant and like movement of elements 70. Conversely, when this operator is rotated upwardly and outwardly from the position of FIG. 1 to that shown in FIG. 3, elements 70 spread the bag as shown in the latter figure to enlarge opening 106.

Provision is preferably made for latching elements 84, 86, and 70 in the "open" position shown in FIG. 3. This is accomplished by a latch 112 pivotally fixed to laterally extending leg portions 114 and 116 of element 86 by loops 118 at the ends of latch legs 120 and 122.

At its other end, latch 112 is formed into a hook 124 engageable in any of a series of apertures 126 in handle 48 of rack 40. Depending upon the particular aperture in which the latch may be engaged, elements 84, 86, and 70 will be immobilized with the upper end of bag 32 completely open or in any one of several partly open positions. The plural apertures also make the holddown device capable of accomodating bags of different sizes.

To facilitate the loading of bags and comestibles into rack 40 and the removal of bags and comestibles therefrom, provision is also preferably made for supporting rack 40 in an elevated position relative to outer container 34 with the bag 32 and its contents at least partly out of the cooking medium. This relationship is shown for a similar cooking utensil in FIG. 12.

The goal just described is attained by deforming the lower end of handle 48 as shown in FIG. 1 to provide a leg 128 extending generally parallel to the side wall 46 of rack 40. To maintain the rack in the elevated position, the rack is lifted, moved horizontally, and lowered. This confines the side wall 64 of outer container 34 between rack side wall 46 and leg 128 with the upper edge 129 of the container side wall engaging a laterally extending portion 130 of handle 48 and supporting the rack.

Many variations may of course be made in the exemplary cooking utensil 30 just described without exceeding the scope of the invention. For example, the bag-holding support may be made imperforate or eliminated; and the assembly 58 for keeping the bag and comestibles submersed in the cooking medium and for opening and closing the mouth of the bag can be mounted directly on outer container 34. Any of several techniques may be employed to keep the bag-holding support in place in the outer container, and both the former and the outer container can be made in a wide variety of shapes and sizes.

Other modifications of comparable character will readily occur to those skilled in the relevant arts.

Figure 3A:
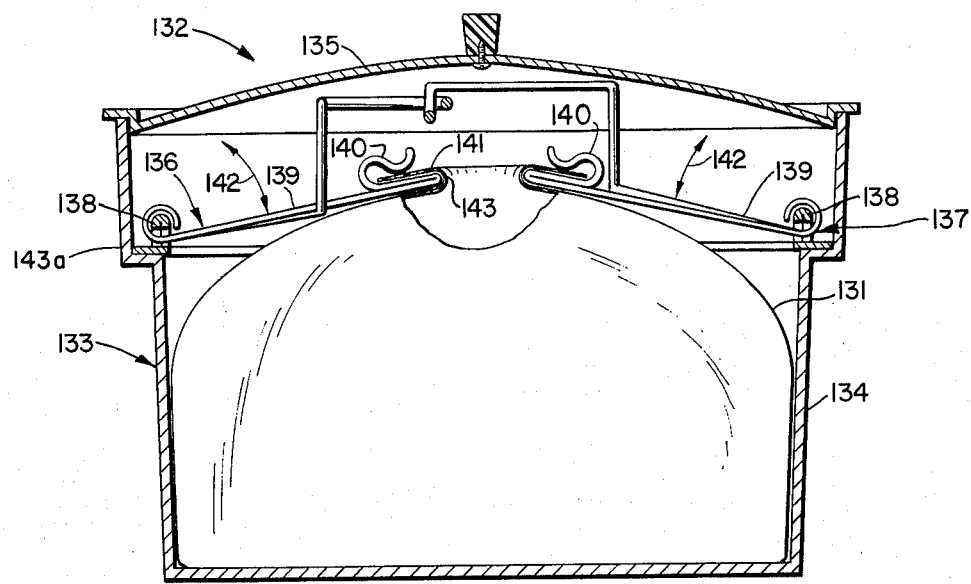
FIG. 3A is a vertical section through a second form of cooking utensil in accord with the present invention which is similar in certain respects to the cooking utensil of FIGS. 1–3.

Cooking utensils in accord with the present invention may also be constructed with a holddown device of the character just described but no rack or inner component. A cooking utensil of this character designed for use with a disposable bag 131 is illustrated in FIG. 3A and identified by reference character 132.

Utensil 132 includes a pan-type component 133 having side walls 134, a lid 135 of conventional construction, and a holddown device 136. The latter consists of an annular ring 137 with a vertical flange 138 to which holddown elements 139 are pivotally attached in the manner described above in conjunction with cooking utensil 30 to keep bag 131 and its contents submersed in a fluid cooking medium in pan component 133.

Holddown elements 139 may be identical to those described earlier except that prongs 110 are omitted, and the inner ends of the elements are deformed into an S-shaped configuration to provide spring clips 140. The upper portion 141 of bag 131 can be inserted at intervals around its periphery into the spring clips to secure the bag to the inner ends of holddown elements 139. (Such spring clips can of course be substituted for prongs 110 in holddown device 58).

The holddown device will also typically include latch elements (not shown) such as those identified by reference characters 84 and 86 in FIGS. 1 and 2. These and elements 139 will be assembled in the relationship described above so that they can all be rotated in unison as indicated by double-headed arrow 142 to the position in FIG. 3A, constricting the opening 143 in the upper end of the bag for the purposes described previously and keeping bag 131 and its contents from floating. As suggested by arrow 142, the holddown elements can also be rotated in the opposite direction. This spreads the upper portion of bag 131, enlarging opening 143 and facilitating access to the interior of the bag.

To keep the bag open, holddown device 136 will also typically be provided with a latch (not shown) such as that identified by reference character 112 in FIGS. 1–3 and a cooperating handle (likewise not shown) having a series of apertures into which the hook end of the latch can be inserted to retain the bag in a fully or partly open configuration.

Holddown device 136 is mounted in cooking utensil component 133 by fixing its rim 137 to a horizontal, annular ledge 143a formed in the side wall 134 of the pan component. This keeps the holddown device from being floated upwardly with bag 131 and its contents.

Cooking utensil 132 can also be used to advantage in cooking by conventional techniques (i.e., without a bag). In such circumstances, also, the holddown device will keep comestibles submersed in a cooking medium.

Many modifications may of course be made in cooking utenstil 132 without exceeding the scope of the invention. Several but by no means even a significant fraction of these are of the character described above in conjunction with the embodiment of the invention illustrated in FIGS. 1–3.

Figure 4:
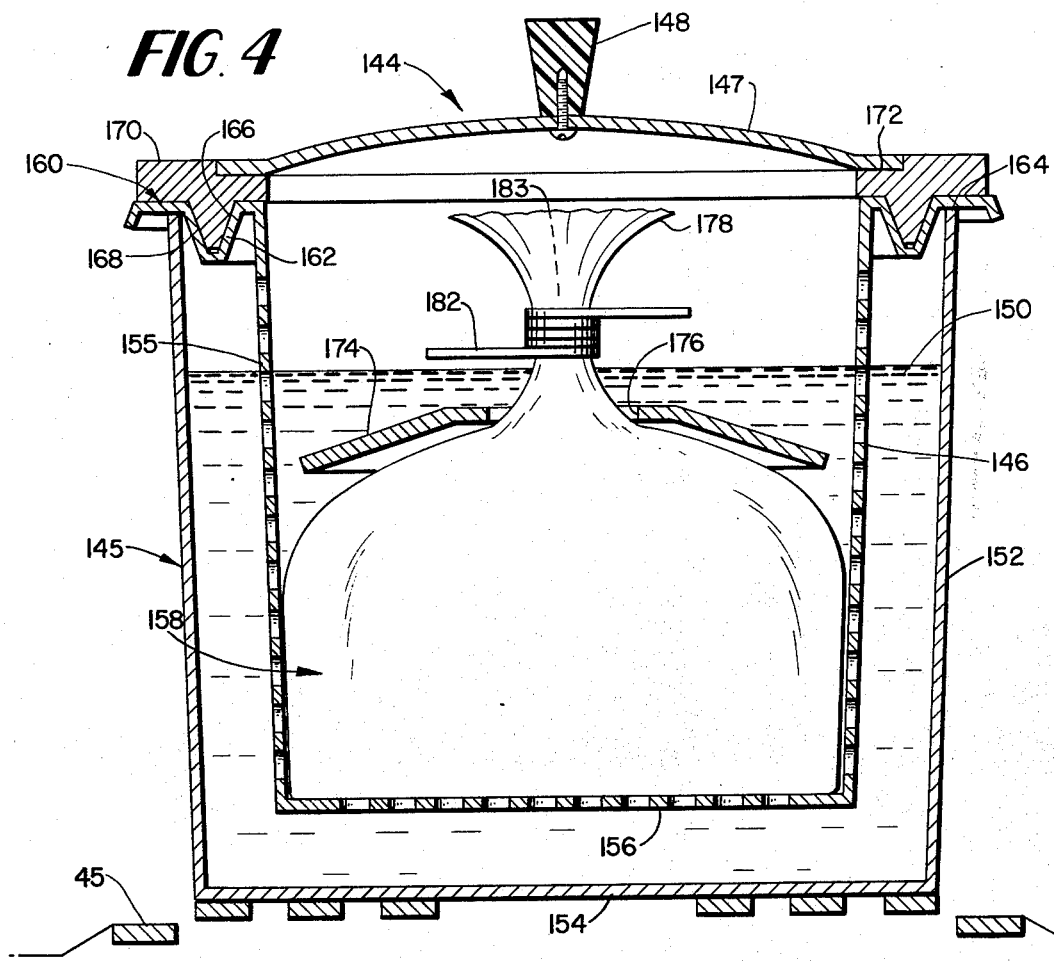
FIG. 4 is a vertical section through a third form of cooking utensil constructed in accord with the principles of the present invention; it shows an alternate arrangement for keeping the mouth of a bag closed while comestibles contained in it are being cooked.

Referring again to the drawing, FIG. 4 depicts a cooking vessel 144, also constructed in accord with the present invention but differing considerably from cooking utensil 30 in appearance. This cooking utensil is also useful for both oven and stovetop cookery.

Cooking utensil 144 includes the same major components as cooking utensil 30. These are an outer container or pan 145, an inner, bag-holding rack or support 146, and a lid 147 with a handle 148.

The outer component 145 of the cooking utensil, which is designed to hold a cooking medium 150 has a vertically extending side wall 152 and a bottom wall 154 like those of conventional pans. It will also typically have one or more handles (not shown) to facilitate handling.

Bag-holding support 146 has a vertically extending, perforate side wall 155 and a perforate bottom wall 156. This permits the cooking medium to circulate freely around and into contact with a disposable bag 158 supported in the rack.

A generally horizontal, outwardly extending flange 160 is formed at the upper end of rack side wall 155. Intermediate its inner and outer edges, a downwardly extending, generally V-shaped projection 162 is formed in flange 160.

Flange 160 rests on the upper edge 164 of outer container side wall 152. This keeps the bottom wall 156 of the rack in spaced relation to the bottom wall 154 of the outer container. Projection 162 keeps the side wall 155 of the rack in spaced relation to outer container side wall 152.

Projection 162 also provides an upwardly opening recess 166 in which a correspondingly configured, depending projection 168 on a ringlike retainer 170 is seated. A recess 172 in the retainer furnishes a seat for lid 147 of the cooking utensil.

Cooking utensil 144 will also typically include a component 174 for keeping the comestibles-filled bag 158 submersed in the cooking medium. This component has a concavoconvex configuration and will typically be made of metal so that it will be heavy enough to keep bag 158 and its contents from floating.

An aperture 176 in component 174 allows the upper, open end 178 of the bag to extend upwardly through the holddown component.

In the cooking arrangement shown in FIG. 4, a tie 182 is employed to narrow the opening 183 in the bag during the cooking cycle. Such ties are conventional and typically consist of a readily deformable wirelike core surrounded by a cellulosic or other covering.

Provision is also made in cooking utensil 144 for holding the upper end 178 of bag 158 open, when desired. This is accomplished by removing lid 147, retaining ring 170, and tie 182. The upper end 178 of the bag is then spread and folded across the flange 160 at the upper end of rack side wall 155. The retaining ring 170 is then replaced, clamping the upper end of the bag in recess 166 to keep it in place.

Again, many modifications may be made in this cooking utensil as described and illustrated without exceeding the scope of the invention. For example, rack 146 may be provided with an arrangement of the character described above in conjunction with cooking utensil 30 for supporting it in an elevated orientation relative to the outer container. And mechanism 58 of the character described in conjunction with cooking utensil 30 may be incorporated into cooking utensil 144 to close and open the upper end of the bag 158 and to keep it from floating in the cooking medium. Other modifications of a similar nature abound.

As discussed above, many of the advantages of the present invention may be obtained by employing cooking utensils in association with disposable liners than than bags. FIG. 7 depicts a cooking utensil 190 of this character. This utensil, like those described previously, is suitable for oven as well as stovetop cookery.

Cooking utensil 190 is similar in construction and appearance to the cooking utensil 144 just described. The same reference characters have accordingly been used to some extent to identify corresponding components of the two utensils.

Referring now to FIG. 7, the side and bottom walls 192 and 194 of the inner component 196 of cooking utensil 190 are imperforate, giving this container the appearance of a conventional cooking vessel. The inner component is lined with a disposable liner 198, typically made of any of several suitable plastics. This liner is secured in place by retainer ring 170, which clamps it against the flange 160 formed at the upper end of the inner component 196.

Except as just described, cooking utensil 190 may be essentially identical to cooking utensil 144. It will, accordingly, not be described further herein.

FIG. 5 depicts the use of a disposable liner in conjunction with a conventional double boiler 200 having an outer pan 202 and an inner pan 204. A cooking medium in the outer pan can circulate around the inner pan to heat comestibles contained in it.

Inner pan 204 is lined with a disposable bag or liner 206 (see FIG. 6). Deformable tabs 208, which may be of the same construction as ties 182, are fixed to the liner at intervals around its upper edge 210. As shown in FIG. 5, these tabs can be bent round the upper edge 212 of the inner double boiler pan side wall 214 to hold the liner in place.

Liners of the character just described can be employed in a wide variety of cooking utensils for the purposes described herein. They can also be employed in conjunction with ties, holddown devices, etc. as alternates to disposable bags.

Returning again to the drawing, FIGS. 8, 9, and 12 are devoted to a cooking utensil 220. This utensil is similar in appearance to cooking utensil 30 but differs in the mechanism provided to keep the comestibles submersed during the cooking cycle. Like those cooking utensils of the present invention described earlier, it is suitable for both stovetop and oven cookery.

Turning now to FIG. 8, cooking utensil 220 includes an outer container or pan 222 for a cooking medium 224; an inner rack or bag-holding device 226 in which a comestibles-containing bag 228 can be disposed; and a lid or cover 229. These components have the same functions as the corresponding components in cooking utensil 30.

The mechanism employed to keep bag 228 and its contents from floating during the cooking cycle and to close and open the bag includes a coverlike holddown device 230, cooperating stops 232, and tabs or prongs 234.

Referring now to both FIGS. 8 and 9, the holddown device is a concavo-convex member with a generally horizontal flange 236 in which notches 258 are formed. The holddown device also includes a handle 239 which extends to the exterior of the cooking utensil through a notch 240 in lid 229. A spring clip 241 in the handle detachably fixes the holddown device to rack 226 so that it will not be floated upwardly by comestibles being cooked.

Stops 232 are of the type discussed previously in conjunction with the embodiment of FIGS. 1–3. They are fixed in any convenient manner to the side wall 242 of rack 226 and extend inwardly therefrom.

As shown in FIG. 9, holddown device 230 can be manipulated by handle 239 to align notches 238 with stops 232. The holddown device is then lowered and rotated until unnotched portions of flange 236 lie beneath the stops as shown in FIG. 8. This locks the holddown device in the illustrated position, making it capable of keeping bag 228 and its contents submerged as shown in the same figure.

Fixed to and extending upwardly from holddown device 230 is a bracket 244. Formed in the bracket is an aperture 246 communicating with the upper edge of the bracket via a slot 248.

The upper portion 249 of bag 228 is gathered to narrow its opening by drawing it through a slot 250 in holddown device 230 into aperture 251 and then displacing this portion of the bag through the slot 248 in bracket 244 into aperture 246.

The bag is held open to facilitate access to its interior by withdrawing its upper end 249 from bracket 244, removing cover 229 and holddown member 230, and impaling the upper portion 249 of the bag on prongs 234 to spread opening 252. The prongs will typically have much the same configuration as those identified by reference character 110 in FIG. 3.

FIG. 12 shows bag 228 with its upper end 249 thus immobilized to facilitate access to its interior through opening 252.

As shown by the same figure, the bag-supporting component 226 of cooking utensil 220 is also preferably provided with a handle 253 generally identical to the handle 48 described previously. FIG. 12 shows a cooking utensil with a guide 254 and ledge 256 formed as in handle 48 engaged with the upper edge of outer container side wall 258. Thus, the outer container supports the bag-holding rack 226 in an elevated position relative to the outer container above the cooking medium 224 in the latter. As discussed above, this facilitates the loading of a bag or bag and contents in the supporting component and the removal of the same therefrom.

Again, many modifications may be made in the illustrated utensil without exceeding the scope of the invention. A number of these, also applicable to cooking utensil 220, were discussed above.

Another modification is to replace fixed prongs 234 with removable prongs such as those identified by reference character 260 in FIGS. 10 and 11. In these figures reference character 262 designates the side wall of a pan-type component as disclosed herein or of conventional construction.

Prongs 260 are fixed in any convenient fashion to the upper ends of spring clip members 264. The latter are simply slipped over the rim or upper edge of the associated cooking utensil component and retained in place by the friction between the wall 262 of the latter and spring clip legs 266 and 268. The spring action of the clip biases the legs toward each other to generate the necessary friction-producing force.

Referring again to the drawing, FIG. 13 depicts a cooking utensil 280 similar to the utensil 220 just described, but designed to be employed in conjunction with a different type of disposable bag 282. The bag is shown in profile in FIG. 14 and pictorially in FIG. 15.

Cooking utensil 280 includes an outer container or pan 284, an inner component or rack 286, and a holddown device 288. Components 284 and 286 may be of generally the same construction as the corresponding components in those embodiments of the invention described previously as may holddown device 288. Notches 290 are formed in the manner described previously in a flange 291 extending from the holddown device. These permit the latter to be rotated by its handle 292 to align the notches with stops 294 fixed to and extending inwardly from rack 286. The holddown device is then lowered and rotated to lock it in place in pan 284. As in the other embodiments of the invention with holddown devices, this keeps bag 282 and its contents submersed in the cooking medium contained in pan 284.

An elongated slot 296 terminating in a circular aperture 298 is formed in the holddown device. A second slot 300 is formed in an upstanding bracket 302 attached to and forming a part of the holddown device.

Referring now to FIGS. 14 and 15, a drawstring member 303, typically formed of wire or a similar, relatively stiff material, is threaded through apertures 304 in the upper portion 306 of the bag, which terminates in an opening 308. The upper end 306 of the bag can be collapsed on member 303 to constrict opening 308 as shown in FIG. 14 or spread apart on this member to enlarge the size of the opening as shown in FIG. 15.

As shown in FIG. 13, the upper end 306 of bag 282 is kept uppermost during the cooking cycle by sliding this portion of the bag through slot 296 into aperture 298 and then folding it laterally and pushing it down through slot 300. When access to the interior of the bag is wanted, the sequence is reversed.

Referring still to FIG. 13, the inner component 286 of the cooking utensil may also be provided with prongs 309 such as those employed in the cooking utensil 220 of FIG. 8, if desired. These increase the versatility of cooking utensil 280 by permitting it to be used with conventional bags in addition to those of the character illustrated in FIGS. 14 and 15.

All of the embodiments of the invention thus far described are in their illustrated form or with only minor modifications useful for both oven and stovetop cookery although they are intended primarily for the latter. FIG. 16, in contrast, depicts a cooking utensil 310 in accord with the present invention intended primarily for oven cookery.

As shown in FIG. 16, cooking utensil 310 consists of a lower, panlike component 312 and a cover component 314 of skeltonized construction. Lower component 312 includes a bottom wall 316 having a raised central portion 318 on which the comestibles 320 rest. This provides peripheral wells 322 in which fluids generated during the cooking cycle can collect.

The lower component 312 also includes one or more side walls identified collectively by reference character 324. A horizontal flange 326 is formed at the upper edge of the side walls to provide a support for cover 314.

Fixed to the outer edge of flange 326 at intervals therealong or formed integrally with the flange are downwardly inclined, triangularly configured prongs 328. These secure in place a disposable liner 330 for pan 312. The liner is put in pan 312, stretched across flange 326, and impaled on prongs 328 to secure it.

Referring now to FIGS. 16 and 17, cover member 314 includes side rails 332, end rails 334, and top rail 336. The latter is supported in parallel, spaced relationship to the side rails by U-shaped end members 338.

Upwardly inclined, triangular prongs 340 are fixed to the side, end, and top rails at intervals therealong. These hold in place a second, disposable, cover liner 342 (see FIG. 16).

Provision is made in cooking utensil 310 to isolate comestibles 320 from the surrounding environment by providing a seal between lower and upper liners 330 and 342 although a complete seal may in many circumstances not be necessary. To this end, generally V-shaped recesses 344 are formed in the flanges 326 at the upper edges of lower component side walls 324. Correspondingly configured projections 346 are formed on the lower sides of cover component side and end rails 332 and 334.

With cover 314 in place, lower and upper liners 330 and 342 are clamped between flanges 326 and side and end rails 332 and 334 to seal the gap therebetween.

To ensure the seal, cooking utensil 310 may also be provided with latches 348 of the character illustrated in FIG. 18 Latches 348 each include a clamp 350 fixed to an associated side rail 332 of retainer component 314 by a vertical pivot pin 354. The clamp can be swung to the illustrated position to engage the associated side rail 332 and a flange 326 on pan 312 and clamp the retainer in place or in the opposite direction as indicated by arrow 356 so that the retainer member can be removed.

It may be necessary, or desirable, to provide for the escape of gases and vapors from the interior of utensil 310 during the cooking cycle. If so, vapor grooves 358 can be formed in the side and/or end rails 332 and 334 of cover 314 as shown in FIGS. 17–19.

As in the case of the embodiments described previously, that illustrated in FIGS. 16-19 is only illustrative. Cooking utensils embodying the precepts of the present invention and intended primarily for oven cookery can differ widely in construction and appearance from that shown in the figures just mentioned. For example, they may have solid rataher than skeletonized covers.

As a further example, FIGS. 20 and 21 depict a cooking utensil 360 in accord with the present invention, which consists of a pan-type container 362 and a rimlike retainer 364 for securing a liner 366 and an optional cover 367 of disposablee material in and to the container.

Container 362 has a bottom wall 368 and side walls identified collectively by reference character 370. The latter terminate in outwardly extending flanges 372 over which the edge portions 374 of liner 366 and 376 of cover 367 are draped. Edge portions 374 and 376 are retained in place by spring clips 380 fixed to the upper sides of flanges 372 at intervals therearound.

The liner and cover (if employed) are secured in place by the previously mentioned retainer 364 and by latches 382. As shown in FIG. 21, the retainer has a U-section matching that at the upper edges of container component side walls 370. This retainer clamps the liner or liner and cover against the upper edges of the side walls when secured in place by latches 382.

Referring still to FIG. 21, each latch 382 has a slide 384 engageable with retainer 364 of cover component 314 and a bracket 386 in which the slide is rectilinearly movable. The brackets are fixed in any convenient fashion to the flanges 372 extending from side walls 370. Slides 384 can be displaced to the position shown in FIG. 21 to clamp the cooking utensil components together or in the direction shown by arrow 388 to release the latches so that retainer 364 can be removed.

The cooking utensil 360 just described can be used for both stovetop and oven cookery with cover 367 being employed as desired for the same purposes as the bags described previously. In use, horizontal flanges 372 protect the edge portions 374 and 376 of the liner and cover from direct radiation from the heating unit, keeping them from being melted.

FIGS. 22 and 23 show yet another technique for securing in place a liner employed in accord with the principles of the present invention. In this case, detachable spring clips 400 secure a liner 402 to the side walls 406 of a pan-type component 408 illustrated in only fragmentary form. One spring clip leg 410 engages the outer side of the container side wall 406 while the second leg 412 clamps liner 402 against the inner side of the wall. The arcuate portion 414 of the spring clip connecting legs 410 and 412 biases the spring clip legs toward each other to produce the requisite clamping force.

As indicated previously, many of the structural features of the present invention may be made in the form of attachments rather than integral parts of a cooking utensil, thereby making the feature available for use with conventional vessels. A number of such attachments have been described previously including the holddown device 174 illustrated in FIG. 4, the disposable bag or liner 206 of FIG. 6, the bag and liner retaining spring clips of FIGS. 10 and 11, and the second form of spring clip-type retainer shown in FIGS. 22 and 23.

FIG. 24 shows yet another attachment in accord with the principles of the present invention; viz., a device 420 for keeping comestibles or a comestibles-filled bag submersed in a cooking medium. This holddown device is similar to that identified by reference character 58 in FIGS. 1–3 except that it is in the form of an attachment rather than being an integral part of a cooking utensil.

FIG. 24 shows the holddown device 420 attached to the side walls 422 of a perforate rack 424 to keep a disposable bag 426 submersed and to selectively constrict and enlarge an opening 428 at the upper end of the bag for the purposes described previously.

It is by no means essential that the attachment be employed with a perforated rack. It may equally well be attached to the inner pan of a double boiler, to an imperforate rack, to a conventional pan, etc. It may be employed in both stovetop and oven cookery.

Referring now to the drawing, holddown device 420 includes a rimlike member or base 430, inwardly extending wire elements 432 of generally the same configuration as those described earlier and identified by reference character 70, and latch elements 434 and 436. These may be essentially identical to those identified by reference characters 84 and 86 in FIGS. 1–3.

The several elements 432, 434, and 436 are fixed to base 430 for concomitant pivotal movement relative to the latter toward and away from each other as indicated by double-headed arrow 438. This constricts and enlarges the opening 428 at the upper end of the bag in the same manner as in holddown device 58.

In attachment 420, the bag is secured to the attachment by inserting its upper end portion 440 into S-shaped spring clips 442 integrally formed at the inner ends of elements 432. Spring clip legs 444 clamp the bag against the associated spring clip legs 446.

As they are of the same character as those described previously and function in the same manner, latch elements 434 and 436 will not be described in detail herein. The remaining major components of the holddown device are vertically oriented spring clips 448 attached to the base or rim 430 of the holddown device. As shown in FIG. 24, the legs 450 and 452 of the spring clips engage opposite sides of the cooking utensil component with which they are employed. The arcuate portions 454 of the clips produce a force which retains the holddown device in place, even against the upward force exerted on it by the comestibles being cooked.

Referring again to the drawing, FIGS. 25 and 26 depict an attachment-type holddown device 460 similar to that shown in FIG. 24, but modified so that a single attachment can be employed with cooking vessels of different sizes. To the extent that the components of attachments 420 and 460 are alike, they have been identified by the same reference characters; and attachment 460 has been shown in only fragmentary form.

The spring clips 461 of holddown device 460 differ from those described previously in that they are integrally formed at one end of a retainer member 462 in which an elongated slot 464 is formed. A retainer 466 extends through slot 464 and is threaded into a horizontal flange 468 at the lower edge of base 470. The base or support may otherwise be identical to the corresponding component in the holddown device identified by reference character 420 in FIG. 24.

The arrangement just described permits spring clips 461 to be adjusted outwardly and inwardly relative to base 470 so that the holddown device can be attached to cooking vessels of different sizes. FIG. 25 shows retainer members 462 adjusted to extend outwardly from support 470 to support the device from the side walls 472 of a vessel 474 larger than the base 470 of the holddown device. Conversely, FIG. 26 shows the same holddown device with retainer members 462 readjusted and extending inwardly to support the holddown device from the side wall 476 of a vessel 478 which is smaller than base 470.

Referring again to the drawing, FIG. 27 depicts yet another holddown device 490 fabricated in the form of an attachment and intended to be primarily employed in conjunction with conventional cooking vessels for the purposes described previously. Like reference characters identify like parts; and the holddown device will be described only to the extent that it differs from those described previously.

Referring now to the drawing, the base or support 492 of holddown device 490 includes a vertical flange 493 to which the pivotal elements 432 and the latch elements (not shown) of the device are attached and an outwardly extending, horizontal flange 494. Legs 496 are attached to flange 494 at intervals around base member 492. These legs, which terminate in feet 498, support the holddown device in the cooking vessel with which it is employed. This may be, for example, a conventional pan such as that shown in FIG. 27 and identified by reference character 500.

This attachment can also be used with cooking vessels which differ in size to some extent. Like those described previously, it can be employed in both stovetop and oven cookery.

I have illustrated in the drawing and described above a variety of cooking utensils and attachments constructed in accord with the principles of the present invention. I have also pointed out that cooking utensils adhering to the principles of the present invention will not necessarily resemble these to any great extent. The present embodiments are, therefore, to be considered in all respects as illustrative and not restrictive, the scope of the invention being indicated by the appended claims rather than by the foregoing description; and all changes which come within the meaning and range of equivalents of the claims are therefore intended to be embraced therein.

What is claimed and desired to be secured by Letters Patent is:

1. The combination of a cooking utensil and a disposable bag for holding the comestibles to be cooked which has an opening in one end thereof, said cooking utensil comprising a container and means for supporting a bag within said container with the open end thereof oriented toward an open end of said container, said bag supporting means comprising a plurality of members which are engageable with the end of the bag in which the opening is formed and are displaceable between first and second positions, said bag engageable members being operable in said one position thereof to gather the bag but to permit gases and vapors to escape from the interior thereof, and said members being operable in said second position thereof to spread the end of the bag and thereby make its interior readily accessible.

2. The combination of claim 1, wherein the means for supporting the comestibles-filled bag and its contents is a separate and independent component of the cooking utensil.

3. The combination of claim 1, wherein said bag engageable members extend inwardly from the periphery of the cooking utensil when said members are in said one position thereof, there also being means for keeping the means in which said bag engageable members are incorporated from moving upwardly relative to the container of the cooking utensil, whereby said last-mentioned means is operable to keep the bag and its contents submersed in a cooking medium contained in the cooking utensil container.

4. The combination of claim 3 wherein said bag supporting means has at least one laterally extending portion and wherein the means for keeping said means bag supporting from moving upwardly comprises a member fixed relative to said container and engageable with the laterally extending portion of the bag supporting means.

5. The combination of claim 1, wherein the bag supporting means includes a component in said container which is operable in one position to support the bag and its contents in spaced relation to walls of the container and means for supporting said support component in a second, more elevated position relative to said container to make more convenient access to the interior of the bag, said container having vertically extending wall means and the means for supporting the bag supporting means in said elevated position comprising a member fixed to the bag supporting means and engageable with the upper edge of the container wall means.

6. The combination of claim 1, wherein the bag supporting means has means in the lower reaches thereof into which a portion of said bag can depend to provide a well in which liquids evolved from the comestibles during the cooking cycle can collect.

7. The combination of claim 1, wherein the bag supporting means includes a perforate rack means disposable in and spaced from said cooking utensil container to so support said bag in said container that a fluid cooking medium in said cooking utensil container can circulate into contact with said bag to cook the comestibles held therein.

8. The combination of claim 1, wherein the disposable bag is a preformed component.

9. The combination of claim 1, wherein the disposable bag is of an unformed material gathered around the comestibles to be cooked.

10. The combination of claim 1, wherein said means for supporting said bag in said container includes means for keeping it in spaced relation to the walls thereof, there being perforations in said last-mentioned means, whereby a cooking medium contained in said container can circulate into contact with at least most of the periphery of the disposable bag to promote uniformity and efficiency in the transfer of heat to said bag and to the comestibles contained therein.

11. The combination of claim 10, wherein the cooking utensil further includes means selectively operable to keep the bag supporting means in a second, more elevated position in the container to facilitate access to the interior of said bag.

12. The combination of a cooking utensil for comestibles and a disposable bag for holding the comestibles to be cooked, said bag having an opening in one end thereof and said cooking utensil comprising a container; means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible; a support means for the bag and its contents which is disposable in said container, said support means having vertically extending side walls and the bag engageable means of the cooking utensil comprising a plurality of inwardly extending elements pivotally fixed to the periphery of said support means at intervals therearound and bag engageable means at the inner ends of said elements; and cooperating means on two diametrically opposed ones of said elements for retaining said bag engageable means in said one operable position thereof.

13. The combination of claim 12, wherein said bag supporting means has a handle extending outwardly from the side wall means thereof and including means for keeping said bag engageable means in said second configuration thereof which comprises cooperating latch means associated with the handle of the bag supporting means and one of the diametrically opposed elements of the bag engageable means.

14. The combination of claim 13, wherein there are a plurality of latch means as aforesaid associated with the handle of the bag supporting means, whereby the bag can be opened to different extents and the bag engaging means adapted for use with bags of different sizes by using the latch means associated with said element in association with different ones of said plurality of latch means.

15. The combination of a cooking utensil for comestibles and a disposable bag for holding the comestibles to be cooked, said utensil comprising a container and means engageable with the comestibles-filled bag to hold said bag in said container and keep it from floating so that said bag can be submersed in a liquid in said container to cook the comestibles in said bag, said bag having an open end and the means for holding down the comestibles-filled bag and its contents including means for gathering the portion of the bag in which the opening is formed and keeping said portion uppermost during the cooking cycle so that gases and vapors can escape through the opening without a cooking medium entering the bag therethrough.

16. The combination of claim 15, wherein the means to which the bag can be attached to enlarge the opening therein are detachable from the bag supporting means.

17. The combination of a cooking utensil for comestibles and a disposable bag for holding the comestibles to be cooked, said bag having an opening in one end thereof and said cooking utensil comprising a container; means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible; selectively operable means for shifting said bag engageable means between said first and second configurations; and means for retaining said bag engageable means in each of said first and second configurations.

18. The combination of a cooking utensil for comestibles and a disposable bag for holding the comestibles to be cooked, said bag having an opening in one end thereof and said cooking utensil comprising a container and means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible and comprising a support means and a plurality of inwardly extending elements pivotally fixed to the periphery of said support means at intervals therearound and bag engageable means at the inner ends of said elements.

19. The combination of a cooking utensil for comestibles and a disposable bag for holding the comestibles to be cooked, said bag having an opening in one end thereof and said cooking utensil comprising a container; means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible; and a support means for the bag and its contents which is disposable in said container, said support means having vertically extending side walls and the bag engageable means of the cooking utensil comprising a plurality of inwardly extending elements pivotally fixed to the periphery of said support means at intervals therearound and bag engageable means at the inner ends of said elements, each of said inwardly extending elements having two leg portions each pivotally fixed relative to the support means and one of the leg portions of each of the elements lying over the closest leg portion of the adjacent element and the other leg portion thereof lying under the nearest leg portion of the element thereadjacent, whereby rotation of one of said elements will effect a concomitant rotation of all of said elements.

20. The combination of a cooking utensil for comestibles and a disposable bag for holding the comestibles to be cooked, said bag having an opening in one end thereof and said cooking utensil comprising a container; means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible; and a support means in said container, the bag engageable means of the cooking utensil comprising a plurality of inwardly extending elements pivotally fixed to the periphery of said support means at intervals therearound and bag attaching means at the inner ends of said elements, each of said inwardly extending elements having two leg portions each pivotally fixed relative to the support means and one of the leg portions of each of the elements lying over the closest leg portion of the adjacent element and the other leg portion thereof lying under the nearest leg portion of the element thereadjacent, whereby rotation of one of said elements will effect a concomitant rotation of all of said elements.

21. The combination of a cooking utensil for comestibles and a disposable bag for holding the comestibles to be cooked, said bag having an opening in one end thereof and said cooking utensil comprising a container; means engageable with said bag to keep the end of the bag having the opening therein uppermost, said last-mentioned means being operable in one configuration thereof to gather the bag but to permit gases and vapors to escape from the interior thereof, the aforesaid means being operable in a second configuration thereof to spread the aforesaid end of the bag and thereby make its interior readily accessible; a support means in said container, the bag engageable means of the cooking utensil comprising a plurality of inwardly extending elements pivotally fixed to the periphery of said support means at intervals therearound and bag engageable means at the inner ends of said elements; and cooperating means on two diametrically opposed ones of said elements for retaining said bag engageable means in said one operable position thereof.

22. A cooking utensil adapted to be used with a disposable bag for holding the comestibles to be cooked which has an opening in one end thereof, said cooking utensil comprising a container and means for supporting a bag within said container with the open end thereof oriented toward an open end of said container, said bag supporting means comprising a plurality of elements which are adapted to be engageable with the end of the bag in which the opening is formed and are displaceable between first and second positions, said bag engageable elements being operable in said one position thereof to gather a bag but to permit gases and vapors to escape from the interior thereof, and said members being operable in said second position thereof to spread the end of the bag and thereby make its interior readily accessible.

23. A cooking utensil according to claim 22, wherein said elements extend inwardly from the periphery of the container toward the center thereof and wherein each of said inwardly extending elements has two leg portions, one of the leg portions of each of the elements lying over the closest leg portion of the adjacent element and the other leg portion thereof lying under the nearest leg portion of the element thereadjacent, whereby rotation of one of said elements will effect a concomitant rotation of all of said elements.

24. A cooking utensil according to claim 23, wherein said container and the means in which said bag engageable elements are incorporated are independent and separable components.

25. A cooking utensil according to claim 22, together with cooperating means on two diametrically opposed ones of said elements for retaining said elements in said one position thereof.

26. A cooking utensil according to claim 25, in which the means in which said inwardly extending elements are incorporated includes a handle and the utensil includes means for keeping said elements in said second position thereof which comprises cooperating latch means associated with said handle and one of the two diametrically opposed elements.

27. A cooking utensil comprising a container having an open, upper end and a plurality of inwardly extending members pivotally mounted at intervals around the periphery of the container at said upper end thereof, each of said inwardly extending members having two leg portions and one of the leg portions of each said member lying over the nearest leg portion of the adjacent member and the other leg portion thereof lying under the nearest leg portion of the member thereadjacent, whereby rotation of one of said elements will effect a concomitant rotation of all of said elements.

* * * * *

UNITED STATES PATENT AND TRADEMARK OFFICE
CERTIFICATE OF CORRECTION

PATENT NO. : 3,946,654
DATED : March 20, 1976
INVENTOR(S) : ALEXANDER PATTON JANSSEN It is certified that error appears in the above—identified patent and that said Letters Patent are hereby corrected as shown below:

Delete claim 16.

On the Cover sheet, "27 claims" should read -- 26 claims --.

Signed and Sealed this

Twenty-third Day of May 1978

[SEAL]

Attest:

RUTH C. MASON
Attesting Officer

LUTRELLE F. PARKER
Acting Commissioner of Patents and Trademarks